(12) United States Patent
Inoue et al.

(10) Patent No.: US 6,336,123 B2
(45) Date of Patent: *Jan. 1, 2002

(54) HIERARCHICAL BASED HYPER-TEXT DOCUMENT PREPARING AND MANAGEMENT APPARATUS

(75) Inventors: Kazunori Inoue, Tokyo; Kazuo Sakushima, Kawasaki; Kyoko Kawaguchi, Matsudo; Yoshiaki Nakanishi, Tokyo, all of (JP)

(73) Assignee: Matsushita Electric Industrial Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/938,931

(22) Filed: Oct. 2, 1997

(30) Foreign Application Priority Data

Oct. 2, 1996 (JP) ............................................. 8-261515

(51) Int. Cl.[7] ......................... G06F 13/00; G06F 17/30; G06F 15/00
(52) U.S. Cl. ...................... 707/501.1; 707/513; 707/1; 345/700
(58) Field of Search ............................. 345/357, 700; 395/710, 200.33; 707/1, 513, 501.1; 709/218, 227, 316

(56) References Cited

U.S. PATENT DOCUMENTS 5,303,379 A * 4/1994 Khoyi et al. ................ 395/710
5,568,640 A * 10/1996 Nishiyama et al. ............ 707/1
5,634,062 A * 5/1997 Shimizu et al. ............. 707/501

(List continued on next page.)

FOREIGN PATENT DOCUMENTS

| EP | 0501770 | 9/1992 |
| JP | 3-192462 | 8/1991 |
| JP | 4-211865 | 8/1992 |

(List continued on next page.)

OTHER PUBLICATIONS

Tilley, Scott R. et al., Personalized information structures II: hyperstructure hotlists, Annual ACM Conference on Systems Documentation, pp. 171–180, Oct. 1995.*

P. G. Ploger, J et al., WWW based structuring of codesigns, International Symposium on Systems Synthesis, pp. 138–143, Sep. 1995.*

Brown, Mark R., Using Netscape 2, 2nd Edition, Que Corporation, p. 24, 1995.*

Oliver, D. et al., Netscape Unleashed, Sams.net Publishing, p. 470, Feb. 1996.*

Feiner S. "Seeing the Forest for the Trees: Hierarchical Display of Hypertext Structure" Conference on Office Information Systems, Palo Alto, Mar. 23–25, 1988, Mar. 1998, pp. 205–212, XP000757445, Allen R B.

Primary Examiner—Stephen S. Hong
Assistant Examiner—William L. Bashore
(74) Attorney, Agent, or Firm—Israel Gopstein Clark & Brody

(57) ABSTRACT

Contents of each of nodes indicating a plurality of hyper-text documents are prepared and revised in a node managing unit as node information. A connection-relationship between two nodes is established and revised for each of the nodes in a hierarchy structure managing unit as hierarchy structure information, and a hierarchy structure of the nodes is established. In this hierarchy structure, one node ranked to the top level is set as a parent node, and the other nodes are set to child nodes. Thereafter, a plurality of hyper-text documents arranged in the hierarchy structure are prepared from the node information and the hierarchy structure information. Therefore, because the contents of each node is managed in dependence of the preparation of the hierarchy structure, the hyper-text documents arranged in the hierarchy structure can be easily prepared.

18 Claims, 16 Drawing Sheets

U.S. PATENT DOCUMENTS

| | | | |
|---|---|---|---|
| 5,644,740 A | * | 7/1997 | Kiuchi .................. 345/357 |
| 5,732,219 A | * | 3/1998 | Blumer et al. ............ 709/227 |
| 5,801,702 A | * | 9/1998 | Dolan et al. ............. 345/357 |
| 5,835,712 A | * | 11/1998 | DuFresne ............ 395/200.33 |
| 5,995,099 A | * | 11/1999 | Horstmann ............. 345/335 |
| 6,035,330 A | * | 3/2000 | Astiz et al. ............. 709/218 |
| 6,189,019 B1 | * | 2/2001 | Blumer et al. ............ 707/513 |
| 6,253,254 B1 | * | 6/2001 | Erlenkoetter et al. ....... 709/316 |

FOREIGN PATENT DOCUMENTS

| | | |
|---|---|---|
| JP | 6-243024 | 9/1994 |
| JP | 6-259312 | 9/1994 |
| JP | 7-325827 | 12/1995 |

* cited by examiner

Node → Node|(Node Jtype Cnode)

Cnode → Node|Node Cnode

Node → node-id1|node-id2|···

Jtype → jtype-id1|jtype-id2|···

HIERARCHY STRUCTURE OF A NODE

HIERARCHY STRUCTURE INFORMATION id1

HIERARCHY STRUCTURE OF NODES

HIERARCHY STRUCTURE INFORMATION (id1 (jtypeA id2 id3 id4))

HIERARCHY STRUCTURE OF NODES

HIERARCHY STRUCTURE INFORMATION
(id1 (jtypeA id2 id3 id4)(jtypeB id5 id6 id7))

HIERARCHY STRUCTURE OF NODES

HIERARCHY STRUCTURE INFORMATION
(id1 (jtypeA id2 id3 (id4 (jtypeB id5 id6 id7))))

FIG. 10

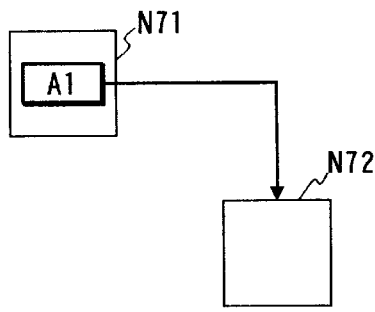

FIG. 11

| CONNECTION TYPE INFORMATION | INDEX TEMPLATE | FUNCTION BUTTON TEMPLATE | INDEX PRODUCING RULE | FUNCTION BUTTON PRODUCING RULE |
|---|---|---|---|---|
| jtype A | index temp A | button temp A | index rule A | button rule A |
| jtype B | index temp B | button temp B | index rule B | button rule B |
| jtype C | index temp C | button temp C | index rule C | button rule C |
| jtype D | index temp D | button temp D | index rule D | button rule D |
| jtype E | index temp E | button temp E | index rule E | button rule E |

1. HIERARCHY STRUCTURE OF NODES

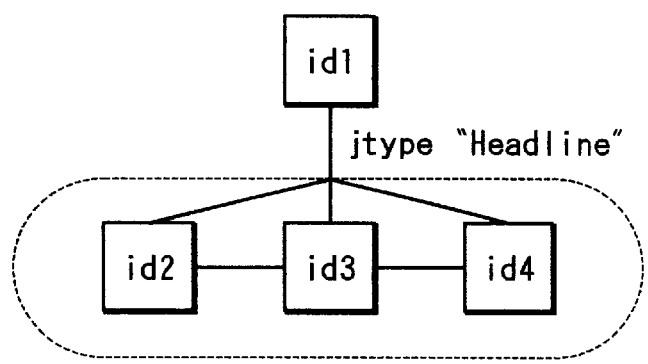

2. LINK AUTOMATIC PRODUCTION INFORMATION

- CONNECTION TYPE INFORMATION ; "jtype Headline"

- INDEX TEMPLATE ; FIRST CHILD NODE
  SECOND CHILD NODE
  THIRD CHILD NODE

- FUNCTION BUTTON TEMPLATE ; (THIRD TYPE OF FUNCTION BUTTON)

- INDEX PRODUCING RULE ; A LIST OF CHILD NODES OF WHICH THE NUMBER IS THE SAME AS THE NUMBER OF CHILD NODES id2 TO id4

- FUNCTION BUTTON PRODUCING RULE ; ALLOCATION OF THE THIRD TYPE OF FUNCTION BUTTON TO EACH CHILD NODE

HYPER-TEXT DOCUMENTS ARRANGED IN HIERARCHY STRUCTURE

HYPER-TEXT DOCUMENTS ARRANGED IN HIERARCHY STRUCTURE

FIG. 14

1. HIERARCHY STRUCTURE OF NODES

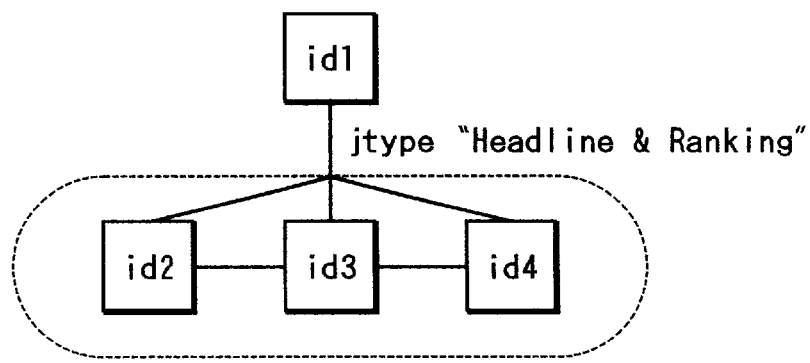

2. LINK AUTOMATIC PRODUCTION INFORMATION

- CONNECTION TYPE INFORMATION ; "jtype Headline & Ranking"

- INDEX TEMPLATE ; FIRST CHILD NODE
  SECOND CHILD NODE
  THIRD CHILD NODE

- FUNCTION BUTTON TEMPLATE ;
  FIRST TYPE  THIRD TYPE  SECOND TYPE

- INDEX PRODUCING RULE ; A LIST OF CHILD NODES OF WHICH THE NUMBER IS THE SAME AS THE NUMBER OF CHILD NODES id2 TO id4

- FUNCTION BUTTON PRODUCING RULE ; ALLOCATION OF THE SECOND AND THIRD TYPES FUNCTION BUTTONS TO TOP CHILD NODE, ALLOCATION OF THE FIRST, SECOND AND THIRD TYPES FUNCTION BUTTONS TO INTERMEDIATE CHILD NODE, ALLOCATION OF THE FIRST AND THIRD TYPES FUNCTION BUTTONS TO FINAL CHILD NODE

FIG. 16

1, HIERARCHY STRUCTURE OF NODES

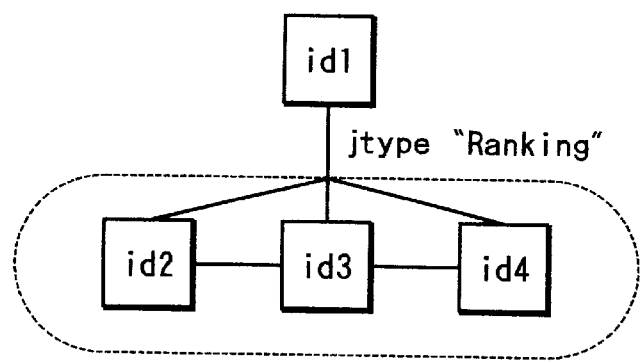

2, LINK AUTOMATIC PRODUCTION INFORMATION

- CONNECTION TYPE INFORMATION ; "jtype Ranking"

- INDEX TEMPLATE ; FIRST CHILD NODE

- INDEX PRODUCING RULE ; A LIST OF A CHILD NODE

- FUNCTION BUTTON PRODUCING RULE ; ALLOCATION OF THE SECOND AND THIRD TYPES FUNCTION BUTTONS TO TOP CHILD NODE, ALLOCATION OF THE FIRST AND SECOND TYPES FUNCTION BUTTONS TO INTERMEDIATE CHILD NODE, ALLOCATION OF THE FIRST TYPE FUNCTION BUTTON TO FINAL CHILD NODE

HYPER-TEXT DOCUMENTS ARRANGED IN HIERARCHY STRUCTURE

HIERARCHICAL BASED HYPER-TEXT DOCUMENT PREPARING AND MANAGEMENT APPARATUS

BACKGROUND OF THE INVENTION

1. Field of the Invention

The present invention relates generally to a document preparing apparatus using a computer, and more particularly to a hyper-text document preparing apparatus in which a document having a hyper-text form is prepared.

2. Description of the Related Art

The transmission and reception of information among a plurality of terminals far from each other through a computer network has been recently performed on an extensive scale. In particular, because a piece of information stored in a computer of a first information supplying terminal has a referential relationship with another piece of information stored in the same computer or a piece of information stored in a computer of a second information supplying terminal, an information transmitting system in which pieces of first information having a referential relationship with each other are stored on one information supplying terminal or a plurality of information supplying terminals and the pieces of first information are transferred to a computer of an information reading terminal has been quickly spread.

In this information transmitting system, a referential relationship among all pieces of information is expressed in a hyper-text form composed of a plurality of nodes and a plurality of links respectively connecting a pair of nodes. For example, a Hyper-Text Markup Language (HTML) which is gradually standardized in an IETF internet draft is often used to express a referential relationship among pieces of hyper-text information transmitted through a computer network. The HTML is a symbolic language based on a standard generalized mark-up language (SGML) and defined in ISO (international standardization organization) 8879:1986.

The HTML is a type of page description language, and each page can be expressed by a single node or a plurality of nodes. A piece of link information for identifying both first information transmitted to second information for reference and the second information is written in an arbitrary position of a page to express each link connecting a pair of nodes by using an identifier allocated to each node. The link information indicates only a referential relationship between information, and any relationship between contents of information is not indicated by the link information.

Contents described in the HTML are mainly used as a common information holding means to have information in a plurality of terminals in common on a TCP/IP network (that is, an internet or an intranet) according to a hyper-text transport protocol (HTTP). The common information holding means is generally called a world wide web (WWW).

The hyper-text is generally used as a data base type for the computer, and many methods and apparatuses for preparing a hyper-text type document are proposed.

2.1. Previously Proposed Art

FIG. 1 shows a conceptual information structure of a conventional hyper-text document as a first prior art.

As shown in FIG. 1, a hyper-text document is composed of a plurality of nodes respectively denoting an element of the document and a plurality of links respectively indicating a referential relationship between a pair of nodes. In detail, a node 101 includes an anchor 102, and a link 103 extending from the anchor 102 to a node 104 exists. Therefore, one node is related with another node through one anchor and one link for each node.

In the hyper-text document, a degree of freedom in the referential relationship between a pair of nodes is high, so that an information structure of the hyper-text document can be arbitrarily designed. In contrast, there is a drawback that a link structure denoting a linking relationship among the nodes is complicated, and the complication of the link structure becomes worse as the number of nodes is increased.

Therefore, in cases where a reader reaches particular information through a plurality of links and nodes, it becomes difficult that the reader recognizes a position of the particular information in the link structure. Also, it becomes difficult for a hyper-text document preparing operator to make the link structure or renew the link structure because of the renewal of a node.

As is described above, to solve the above drawbacks occurring when the hyper-text document is utilized, various prior arts have been proposed.

As a second prior art, a Published Unexamined Japanese Patent Application No. H3-192462 (1991) and a Published Unexamined Japanese Patent Application No. H4-211865 (1992) are proposed. In these applications, the relationship among a plurality of documents having a plurality of predetermined formats is defined in advance, so that the necessity for spreading a link each time a document is prepared is eliminated.

As a third prior art, a Published Unexamined Japanese Patent Application No. H6-243024 (1994) is proposed. In this application, a concept of nodes and links is extended to a new concept of fields and anchors, each field is composed of a plurality of nodes arranged in a set, each field has information relating to a meaning represented by a node set of field, so that a relationship in meaning between nodes is clarified.

As a fourth prior art, a Published Unexamined Japanese Patent Application No. H6-259312 (1994) is proposed. In this application, a tree structure is secondarily extracted from a network structure of hyper-text documents, and a network type document is easily processed by using the tree structure. Also, because an arbitrary portion of the hyper-text documents is expressed by a tree structure, it is possible that an outline editor using the hyper-text documents expressed by a tree structure is used to edit the hyper-text documents.

Therefore, in the second, third and fourth prior arts, a link concept denoting the simple referential relationship between the nodes included in the hyper-text document is extended, and the difficulty in the link management is improved.

2.2. Problems to be Solved by the Invention

However, in the first prior art, because each link of the hyper-text document written according to the conventional HTML has only a function of reference from one node to another node, an interface used as a reading means is used for only reference.

Also, in the second prior art, a document to be prepared is limited to a plurality of predetermined format types of documents relating to each other such as a specification document, an account document or the like. Therefore, the second prior art is not appropriate for a hyper-text document preparing apparatus in which a plurality of types of documents having various formats are used. That is, because a format of the document is limited to one of the predetermined formats, a degree of freedom in expressing the document is lowered.

Also, in the third prior art, because an interface used by a reader depends on contents of the field, the link management for documents performed by using the same interface cannot be simplified. That is, a reader is required to understand the meaning represented by a node set of field and to use an interface corresponding to the meaning for the purpose of referring to the field for a piece of particular information relating to the meaning, so that the interface used as a reading means is limited.

Also, in the fourth prior art, because the main purpose is to secondarily extract an easily-treated tree structure from a network structure of hyper-text documents, when a network structure of hyper-text documents having a large number of nodes is prepared and managed, the troublesomeness required to manually prepare and manage each of links is not reduced. Also, because the outline editor unique to the fourth prior art is used, the fourth prior art is not appropriate to generate HTML documents on an internet used for various users.

Therefore, in a hyper-text document preparing apparatus used to output HTML documents, it is required to provide a function for supporting a link management of a document preparing person, generate HTML documents used for all-purpose and provide a mechanism not to confuse a reader of an HTML document.

SUMMARY OF THE INVENTION

A first object of the present invention is to provide, with due consideration to the drawbacks of such a conventional hyper-text document preparing apparatus, a hyper-text document preparing apparatus in which a degree of freedom for the expression of hyper-text documents is high, each of links functions as a simple reference and referential relationship among the hyper-text documents is clarified in a hyper-text document preparation.

A second object of the present invention is to provide a hyper-text document preparing apparatus in which the troublesomeness required to prepare and manage links in a hyper-text document preparation and a hyper-text document editing operation is reduced.

A third object of the present invention is to provide a hyper-text document preparing apparatus in which relationships among a plurality of hyper-text documents are easily grasped by a hyper-text document preparing person and a hyper-text document reader and the link structure of hyper-text documents is easily handled.

The first object is achieved by the provision of a hyper-text document preparing apparatus, comprising:

receiving means for receiving pieces of character information respectively indicating characters for a hyper-text document indicated by a node, pieces of connection information respectively indicating a connection of a node or a group of nodes with another node or another group of nodes and pieces of connection type information respectively indicating a type of the connection;

node managing means for preparing or revising each of a plurality of nodes according to the pieces of character information to produce pieces of node information respectively indicating contents of each node;

hierarchy structure managing means for establishing or revising a connection-relationship between a node or a group of nodes and another node or another group of nodes according to one piece of connection information and one piece of connection type information corresponding to the connection information for each of the nodes of which the pieces of node information are produced by the node managing means and producing hierarchy structure information indicating a hierarchy structure in which the nodes having the connection-relationships with each other are arranged; and hyper-text document preparing means for preparing a group of hyper-text documents, in which a plurality of hyper-text documents are arranged in the hierarchy structure, from the node information produced by the node managing means and the hierarchy structure information produced by the hierarchy structure managing means.

In the above configuration, when pieces of character information are received, each of a plurality of nodes indicating a plurality of hyper-text documents is prepared or revised according to the character information, and pieces of node information respectively indicating contents of each node are produced by the node managing means. Thereafter, when pieces of connection information and pieces of connection type information corresponding to the pieces of connection information are received, a connection-relationship between a node or a group of nodes and another node or another group of nodes is established or revised according to one piece of connection information and one piece of connection type information by the hierarchy structure managing means for each node. Therefore, a hierarchy structure of the nodes is made.

Thereafter, a plurality of hyper-text documents arranged in the hierarchy structure are prepared by the hyper-text document preparing means from hierarchy structure information indicating the hierarchy structure and the node information produced by the node managing means. In this case, the arrangement of the hyper-text documents in the hierarchy structure is determined according to the hierarchy structure information produced by the hierarchy structure managing means, and the contents of each hyper-text document are indicated by the node information.

Accordingly, because the preparation or revision of the arrangement of the hyper-text documents in the hierarchy structure is performed independent of the preparation or revision of the contents of the hyper-text documents, the hyper-text documents arranged in the hierarchy structure can be easily prepared. In particular, in cases where each connection-relationship between two nodes functions as a referential relationship, a plurality of hyper-text documents of which referential relationships are clarified in the hierarchy structure can be easily prepared.

Also, because a connection-relationship between a node or a group of nodes and another node or another group of nodes is established or revised for each node, any arrangement of the hyper-text documents in the hierarchy structure can be reliably and easily performed, so that a degree of freedom for the arrangement of the hyper-text documents is high.

It is preferred that the hyper-text document preparing apparatus further comprise:

link automatic production information storing means for storing pieces of link automatic production information respectively indicating a group of data allocated to the nodes having the hierarchy structure produced by the hierarchy structure managing means; and link information automatic producing means for selecting a particular piece of link automatic production information from the pieces of link automatic production information stored in the link automatic production information means according to an information selecting instruction received by the receiving means, allocating anchor information obtained from the particular piece of link automatic production information to each node according to the node information produced by the node managing means and the hierarchy structure information produced by the hierarchy structure managing means, and automatically producing link information indicating a linking relationship between one node functioning as an original node and another node functioning as a referential node for each of the nodes according to the anchor information to perform a referential movement from the original node to the referential node, a group of hyper-text documents, in which a plurality of hyper-text documents are arranged in the hierarchy structure and are related to each other in the linking relationships, being prepared from the node information produced by the node managing means, the hierarchy structure information produced by the hierarchy structure managing means and the link information.

In the above configuration, a linking relationship between an original node and a referential node is automatically produced for each of the nodes, and a user reading contents of the original node can refer to the referential node. Therefore, the troublesomeness required to prepare and manage link relationships in a hyper-text document preparation and a hyper-text document editing operation can be reduced.

The third object is achieved by the provision of a hyper-text document preparing apparatus, comprising:

receiving means for receiving pieces of character information respectively indicating characters for a hyper-text document indicated by a node, pieces of connection information respectively indicating a connection of a node or a group of nodes with another node or another group of nodes and pieces of connection type information respectively indicating a type of the connection;

node managing means for preparing or revising each of a plurality of nodes according to the pieces of character information to produce pieces of node information respectively indicating contents of each node;

hierarchy structure managing means for establishing or revising a connection-relationship between a node or a group of nodes and another node or another group of nodes according to one piece of connection information and one piece of connection type information corresponding to the connection information for each of the nodes of which the pieces of node information are produced by the node managing means and producing hierarchy structure information indicating a hierarchy structure in which the nodes having the connection-relationships with each other are arranged; and hierarchy structure displaying means for preparing the hierarchy structure of a plurality of nodes from the hierarchy structure information produced by the hierarchy structure managing means and displaying the hierarchy structure of the node.

In the above configuration, the hierarchy structure of the nodes is displayed by the hierarchy structure displaying means. Therefore, connection-relationships among a plurality of nodes (or hyper-text documents) can be easily grasped by a hyper-text document preparing person and a hyper-text document reader, and the hierarchy structure of nodes (or hyper-text documents) can be easily handled.

It is preferred that the hyper-text document preparing apparatus, further comprise hierarchy structure changing means for changing the hierarchy structure information produced by the hierarchy structure managing means according to a hierarchy structure changing instruction received by the receiving means, a changed hierarchy structure of a plurality of nodes being prepared and displayed by the hierarchy structure displaying means according to the changed hierarchy structure information.

In the above configuration, the hierarchy structure of the nodes can be easily changed.

BRIEF DESCRIPTION OF THE DRAWINGS

The objects, features and advantages of the present invention will be apparent from the following description taken in conjunction with the accompanying drawings, in which:

FIG. 10 shows an example of a linking relationship between an original node and a referential node;

FIG. 11 shows pieces of link automatic production information stored in a link automatic production information storing unit shown in FIG. 9;

FIG. 12 shows an example of a hierarchy structure of nodes and link automatic production information determined in cases where a user selects connection type information "jtype Headline";

FIG. 14 shows an example of a hierarchy structure of nodes and link automatic production information determined in cases where a user selects connection type information "jtype Headline and Ranking";

FIG. 16 shows an example of a hierarchy structure of nodes and link automatic production information determined in cases where a user selects connection type information "jtype Ranking";

DETAILED DESCRIPTION OF THE EMBODIMENTS

Preferred embodiments of a hyper-text document preparing apparatus according to the present invention are described with reference to drawings.

First Embodiment

Figures 2, 4:
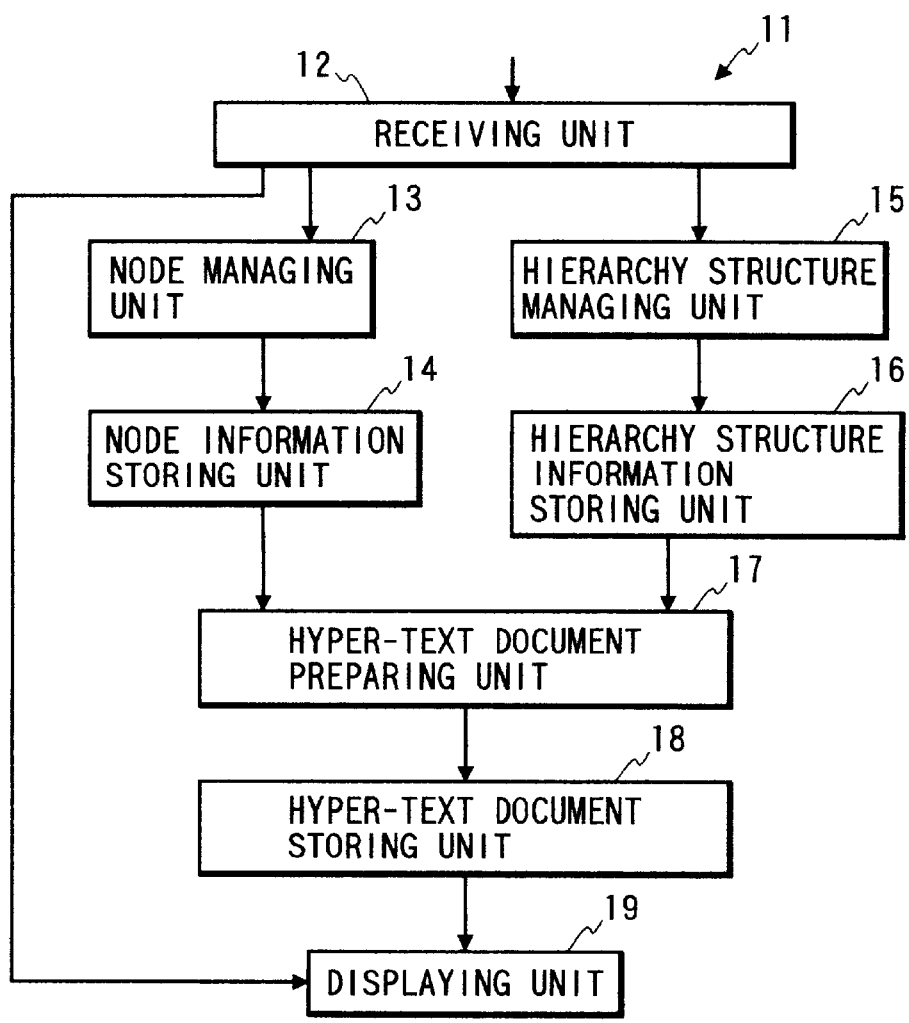
FIG. 2 is a block diagram of a hyper-text document preparing apparatus according to a first embodiment of the present invention.
FIG. 4 shows fundamental hierarchy structure information expressed in a context-free grammar.

FIG. 2 is a block diagram of a hyper-text document preparing apparatus according to a first embodiment of the present invention.

As shown in FIG. 2, a hyper-text document preparing apparatus 11 comprises a receiving unit 12 for receiving pieces of character information respectively indicating characters for a hyper-text document indicated by one node, pieces of connection information respectively indicating a connection-relationship (or a connection) between two nodes, connection type information indicating a connection type between the nodes related to each other according to each piece of connection information, supplementary information relating to contents of WWW and management information indicating the management of image information from a user, a node managing unit 13 for preparing or revising one hyper-text document indicated by one node for each node according to the character information received by the receiving unit 12 to obtain node information, a node information storing unit 14 for storing the pieces of node information obtained in the node managing unit 13, a hierarchy structure managing unit 15 for specifying all nodes of which the pieces of node information are stored in the node information storing unit 14, and establishing or revising a connection-relationship between a parent node and a child node or a group of child nodes or a connection-relationship between a child node (or a group of child nodes) and another child node (or another group of child nodes) for all nodes according to the pieces of connection information and the pieces of connection type information received by the receiving unit 12 to obtain hierarchy structure information indicating a hierarchy structure composed of the nodes such as a parent node and one or more child nodes and links respectively connecting a parent node, a child node or a group of child nodes with another child node or another group of child nodes, a hierarchy structure information storing unit 16 for storing the hierarchy structure information obtained in the hierarchy structure managing unit 15, a hyper-text document preparing unit 17 for producing hyper-text expression information, which indicates contents of a plurality of hyper-text documents described in the HTML and the hierarchy structure of the hyper-text documents, from the node information stored in the node information storing unit 14 and the hierarchy structure information stored in the hierarchy structure information storing unit 16 to prepare the hyper-text documents arranged in the hierarchy structure, a hyper-text document storing unit 18 for storing the hyper-text expression information produced by the hyper-text document preparing unit 17 as a group of hyper-text documents in which the nodes are arranged in the hierarchy structure, and a displaying unit 19 for specifying a particular hyper-text document related to a remarked hyper-text document currently read by a user according to the hyper-text expression information stored in the hyper-text document storing unit 18 in cases where a user inputs a displaying request to the receiving unit 12 to display a hyper-text document related to the remarked hyper-text document and displaying contents of the particular hyper-text document.

In the hierarchy structure managing unit 15, one child node or a group of child nodes can be related to one parent node, and one child node or a group of child nodes can be related to one child node existing in another group of child nodes. Therefore, a plurality of nodes such as a parent node and one or a plurality of child nodes can be arranged in a hierarchy structure.

Figure 1:
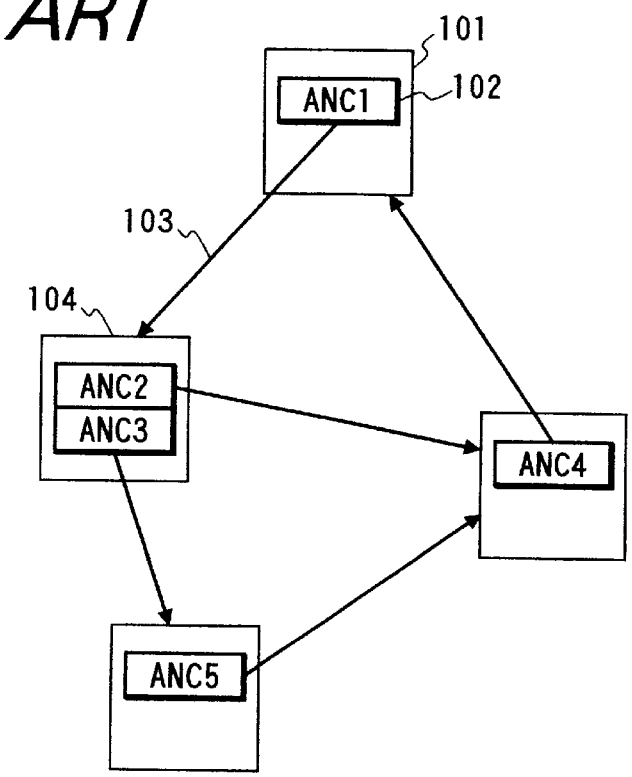
FIG. 1 shows a conceptual information structure of a conventional hyper-text document as a first prior art.
Figure 3:
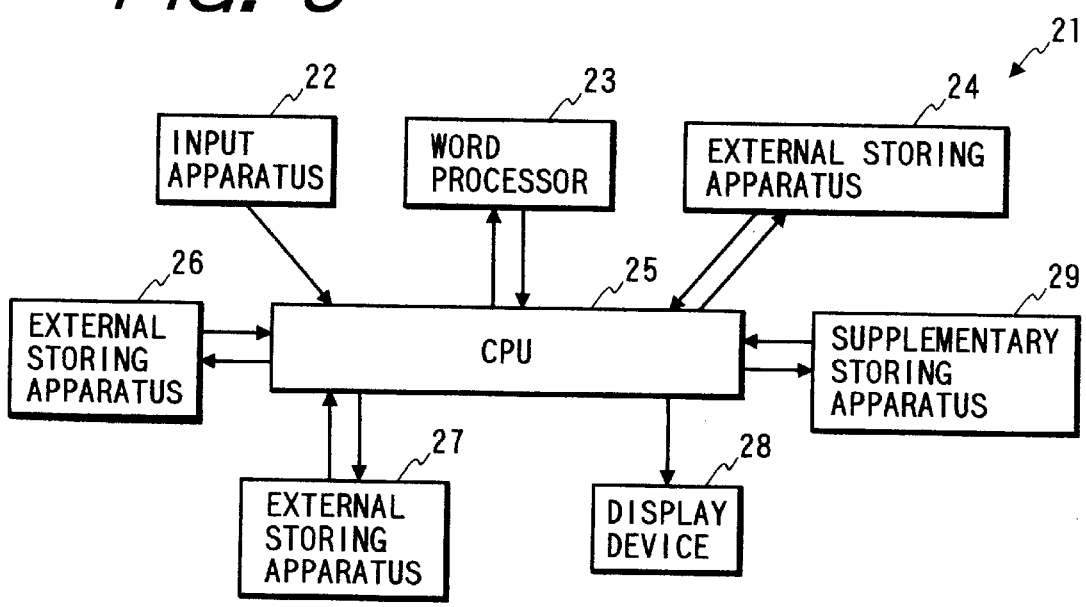
FIG. 3 is a block diagram of a computer apparatus in which a software program is executed to perform the operation of the hyper-text document preparing apparatus shown in FIG. 2.

As shown in FIG. 3, the operation of the hyper-text document preparing apparatus 11 is performed by executing a software program in a computer apparatus 21. An input apparatus 22 such as a keyboard or a pointing device is used as the receiving unit 12. A word processor (or a desktop publishing) 23 is used as the node managing unit 13. An external storing apparatus 24 is used as the node information storing unit 14. A central processing unit 25 is used as the hierarchy structure managing unit 15 and the hyper-text document preparing unit 17. An external storing apparatus 26 is used as the hierarchy structure information storing unit 16. An external storing apparatus 27 is used as the hyper-text document storing unit 18. A display device 28 is used as the displaying unit 19 to display a particular hyper-text document arranged in the hierarchy structure according to the hyper-text expression information.

Hierarchy structure information obtained in the hierarchy structure managing unit 15 is described in detail. FIG. 4 shows fundamental hierarchy structure information expressed in a context-free grammar. All pieces of hierarchy structure information treated in the hyper-text document preparing apparatus 11 are respectively expressed in an expansion form of "Node". In FIG. 4, "Node" denotes a non-terminal symbol expressing a node, "Jtype" denotes a non-terminal symbol expressing a connection type, "Cnode" denotes a non-terminal symbol expressing a group of child nodes, "node-id1" and "node-id2" respectively denote a terminal symbol expressing a node, and "jtype1" and "jtype2" respectively denote a terminal symbol expressing a connection type. Also, parentheses "(" and ")" are respectively used as a terminal symbol. Each piece of hierarchy structure information is expressed by a series of terminal symbols according to the context-free grammar. For example, Node→Node|(Node Jtype Cnode) denotes that "Node" is expanded to "Node" or "(Node Jtype Cnode)", and "Node" of "(Node Jtype Cnode)" can be again expanded to "(Node Jtype Cnode)".

Figure 5:
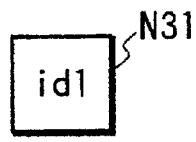
FIG. 5 shows a hierarchy structure of a node and hierarchy structure information indicating the hierarchy structure of the node according to the context-free grammar as a first example.
Figure 6:
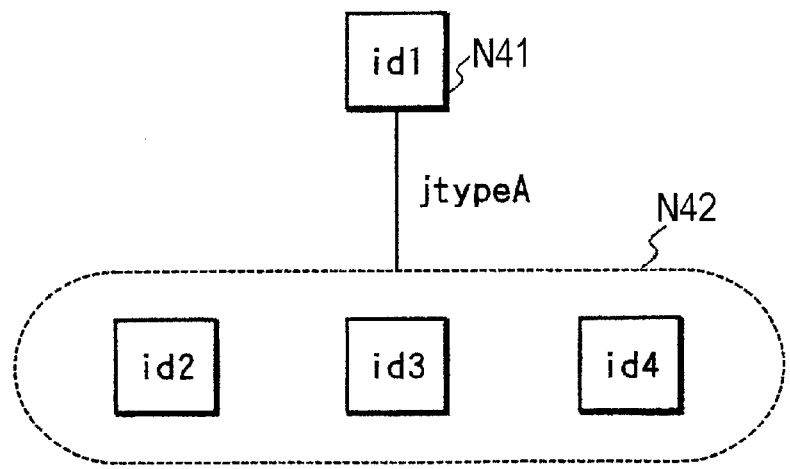
FIG. 6 shows a hierarchy structure of a parent node and a group of child nodes and hierarchy structure information indicating the hierarchy structure of the nodes according to the context-free grammar as a second example.
Figure 7:
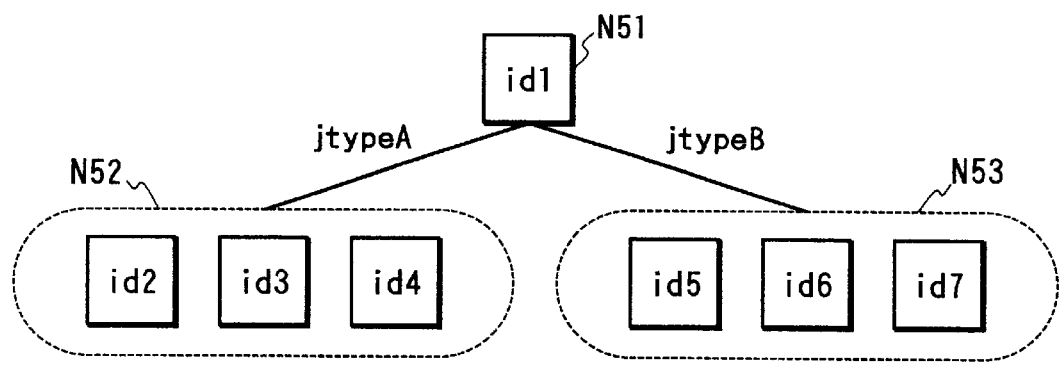
FIG. 7 shows a hierarchy structure of a parent node, a group of child nodes and another group of child nodes and hierarchy structure information indicating the hierarchy structure of the nodes according to the context-free grammar as a third example.
Figure 8:
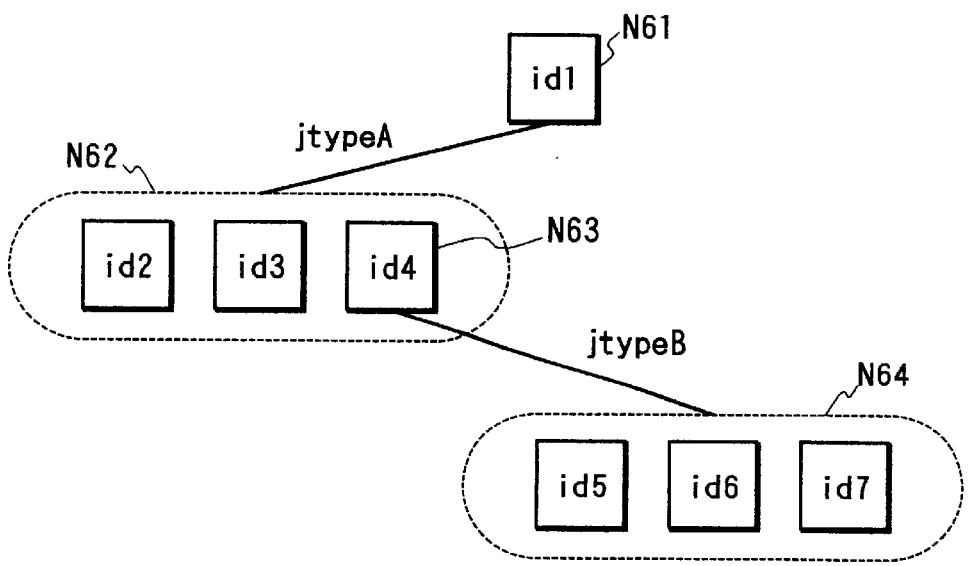
FIG. 8 shows a hierarchy structure of a parent node, a group of child nodes and another group of child nodes and hierarchy structure information indicating the hierarchy structure of the nodes according to the context-free grammar as a fourth example.

FIG. 5 shows a hierarchy structure of a node N31 and hierarchy structure information id1 of the node N31 as a first example, FIG. 6 shows a hierarchy structure of a parent node N41 and a group of child nodes N42 and hierarchy structure information of the nodes N41 and N42 as a second example, FIG. 7 shows a hierarchy structure of a parent node N51, a group of child nodes N52 and another group of child nodes N53 and hierarchy structure information of the nodes N51, N52 and N53 as a third example, and FIG. 8 shows a hierarchy structure of a parent node N61, a group of child nodes N62 and another group of child nodes N64 and hierarchy structure information of the nodes N61, N62 and N64 as a fourth example.

A rectangle ▯ denotes a node, and "id1", "id2", "id3", "id4", "id5", "id6" and "id7" respectively obtained by combining a symbol "id" and a numeral denote an identifier of the node N31, respectively. "jtypeA" and "jtypeB" respectively obtained by combining "jtype" and an alphabet denote a connection information identifier expressing a connection type of a group of child nodes, respectively. The connection type is indicated by connection type information included in connection information.

As shown in FIG. 5, only one node N31 identified by the identifier id1 exists in the hierarchy structure. Therefore, there is one hierarchy level in this hierarchy structure. In this case, the hierarchy structure information is expressed by the identifier id1.

As shown in FIG. 6, a group of child nodes N42 composed of child nodes identified by the identifiers id2, id3 and id4 is connected with a parent node N41 in a connection type "jtypeA" according to connection information indicating a connection-relationship between the node N41 and the group of nodes N42. The connection type "jtypeA" is indicated by connection type information included in the connection information, and the group of child nodes N42 is set to a hierarchy level lower than that of the parent node N41. Therefore, there are two hierarchy levels in this hierarchy structure. In this case, the hierarchy structure information is expressed by (id1 (jtypeA id2 id3 id4)).

As shown in FIG. 7, a group of child nodes N52 composed of child nodes identified by the identifiers id2, id3 and id4 is connected with a parent node N51 in a connection type "jtypeA" according to first connection information indicating a connection-relationship between the node N51 and the group of nodes N52. The connection type "jtypeA" is indicated by connection type information included in the first connection information. Also, another group of child nodes N53 composed of child nodes identified by the identifiers id5, id6 and id7 is connected with the parent node N51 in a connection type "jtypeB" according to second connection information indicating a connection-relationship between the node N51 and the group of nodes N53. The connection type "jtypeB" is indicated by connection type information included in the second connection information. Therefore, the groups of child nodes N52 and N53 are set to the same hierarchy level lower than that of the parent node N51, and there are two hierarchy levels in this hierarchy structure. In this case, the hierarchy structure information is expressed by (id1(jtypeA id2 id3 id4)(jtypeB id5 id6 id7)).

As shown in FIG. 8, a group of child nodes N62 composed of child nodes identified by the identifiers id2, id3 and id4 is connected with a parent node N61 in a connection type "jtypeA" according to first connection information indicating a connection-relationship between the node N61 and the group of nodes N62. The connection type "jtypeA" is indicated by connection type information included in the first connection information. Also, another group of child nodes N64 composed of child nodes identified by the identifiers id5, id6 and id7 is connected with a child node N63 identified by the identifier id4 of the group of child nodes N62 in a connection type "jtypeB" according to second connection information indicating a connection-relationship between the node N63 and the group of nodes N64. The connection type "jtypeB" is indicated by connection type information included in the second connection information. Therefore, the group of child nodes N62 is set to a hierarchy level lower than that of the parent node N61 by one hierarchy level, the group of child nodes N64 is set to a hierarchy level lower than that of the group of child nodes N62, and there are three hierarchy levels in this hierarchy structure. In this case, the hierarchy structure information is expressed by (id1(jtypeA id2 id3 (id4(jtypeB id5 id6 id7)))).

In cases where a user desires to arrange a plurality of nodes in four or more hierarchy levels or connect a plurality of groups of child nodes with the same parent or child node, hierarchy structure information indicating a hierarchy structure, in which a plurality of nodes are arranged in four or more hierarchy levels or a plurality of groups of child nodes are connected with the same parent or child node, can be obtained by combining the pieces of hierarchy structure information shown in FIGS. 5 to 8.

Therefore, the number of hierarchy levels or the number of nodes connected with each other is not limited. Also, a degree of freedom for the expression of the hierarchy structure of the hyper-text documents is high.

In the above configuration of the hyper-text document preparing apparatus 11, a hyper-text document preparing operation is described.

When character information indicating characters for a node is received in the receiving unit 12, a hyper-text document indicated by the node is prepared or revised according to the character information in the node managing unit 13. Thereafter, node information indicating prepared or revised contents of the hyper-text document (or the node) is stored in the node information storing unit 14. This operation is performed for all hyper-text documents (or all nodes) processed in this apparatus 11.

Thereafter, when pieces of connection information and pieces of connection type information are received in the receiving unit 12, as shown in FIGS. 6, 7 and 8, a node (or a group of nodes) set in a first hierarchy level is connected with another node (or another group of nodes) set in a second hierarchy level lower than the first hierarchy level for each node according to one piece of connection information, a connection type of the connection is determined according to the connection type information corresponding to the piece of connection information, a peculiar node placed in the highest hierarchy level is set as a parent node, and the other nodes are set as child nodes. Therefore, a connection-relationship between a parent node and a child node or a group of child nodes or a connection-relationship between a child node (or a group of child nodes) and another child node (or another group of child nodes) is established for all nodes according to the pieces of connection information and the pieces of connection type information in the hierarchy structure managing unit 15 to obtain hierarchy structure information indicating a hierarchy structure of the parent and child nodes. The hierarchy structure information is stored in the hierarchy structure information storing unit 16.

Thereafter, hyper-text expression information indicating a plurality of hyper-text documents arranged in the hierarchy structure is produced from the node information and the hierarchy structure information in the hyper-text document preparing unit 17. The hyper-text expression information is stored in the hyper-text document storing unit 18.

Thereafter, when a user inputs a displaying request to the receiving unit 12 to display a hyper-text document related to a remarked hyper-text document currently read by the user, a particular hyper-text document connected with the remarked hyper-text document in the hierarchy structure is selected as a hyper-text document related to the remarked hyper-text document according to the hierarchy structure information of the hyper-text expression information, and contents of the particular hyper-text document are displayed in the displaying unit 18 according to the node information of the hyper-text expression information.

Accordingly, because the node information indicating the contents of each hyper-text document is obtained in the node managing unit 13 and a hierarchy structure of the hyper-text documents is obtained in the hierarchy structure managing unit 15, the preparation of the contents of each hyper-text document can be performed independent of the determination of the hierarchy structure of the hyper-text documents. Therefore, in cases where each connection-relationship between two nodes functions as a referential relationship, a plurality of hyper-text documents of which referential relationships are clarified in a hierarchy structure can be easily prepared.

Also, because a plurality of hyper-text documents are arranged in a hierarchy structure, in cases where a user desires to refer to a particular hyper-text document related to a remarked hyper-text document currently read by the user, the particular hyper-text document can be easily selected, and the user can reliably read contents of the particular hyper-text document.

Second Embodiment

Figure 9:
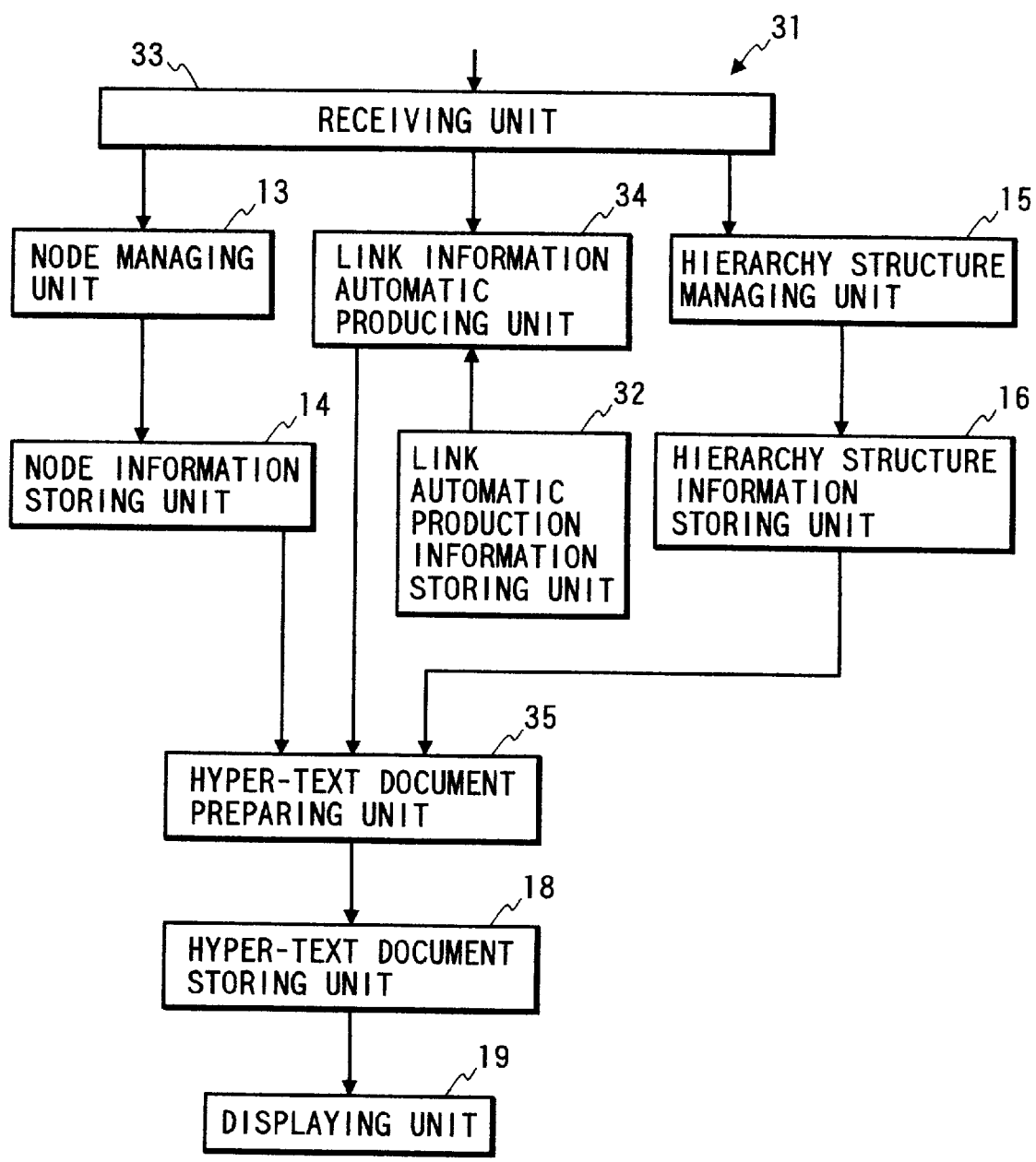
FIG. 9 is a block diagram of a hyper-text document preparing apparatus according to a second embodiment of the present invention.

FIG. 9 is a block diagram of a hyper-text document preparing apparatus according to a second embodiment of the present invention.

As shown in FIG. 9, a hyper-text document preparing apparatus 31 comprises
  a link automatic production information storing unit 32 for storing pieces of link automatic production information respectively composed of connection type information, an index template, a function button template, an index producing rule and a function button producing rule;
  a receiving unit 33 for receiving pieces of character information respectively indicating characters for a hyper-text document indicated by one node, pieces of connection information respectively indicating a connection-relationship between two nodes, a link automatic production information selecting instruction, supplementary information relating to contents of WWW and management information indicating the management of image information from a user,
  the node managing unit 13, the node information storing unit 14, the hierarchy structure managing unit 15, the hierarchy structure information storing unit 16,
  a link information automatic producing unit 34 for selecting a particular piece of link automatic production information from the pieces of link automatic production information stored in the link automatic production information storing unit 32 according to the link automatic production information selecting instruction, allocating anchor information such as index information indicated by one index producing rule and one index template of the particular piece of link automatic production information or function button information indicated by one function button producing rule and one function button template of the particular piece of link automatic production information to each node according to the node information produced by the node managing unit 13, the hierarchy structure information produced by the hierarchy structure managing unit 15 and one piece of connection type information of the particular piece of link automatic production information to automatically produce link information indicating a linking relationship between one node functioning as an original node and another node functioning as a referential node for each node,
  a hyper-text document preparing unit 35 for producing hyper-text expression information indicating a group of hyper-text documents, in which the hyper-text documents described in the HTML are arranged in the hierarchy structure and are related to each other in the linking relationships, from the node information stored in the node information storing unit 14, the hierarchy structure information stored in the hierarchy structure information storing unit 16 and the link information produced by the link information automatic producing unit 34 to prepare the hyper-text documents arranged in the hierarchy structure,
  the hyper-text document storing unit 18 for storing the hyper-text expression information produced by the hyper-text document preparing unit 35 as the group of hyper-text documents in which the nodes connected with each other though the links are arranged in the hierarchy structure, and the displaying unit 19.

A supplementary storing apparatus 29 shown in FIG. 3 is used as the link automatic production information storing unit 32, and the central processing unit 25 is used as the link information automatic producing unit 34.

As shown in FIG. 10, the anchor information A1 allocated to each hyper-text document by the link information automatic producing unit 34 is one or more character strings or one or more figures and is placed in a specific region of each hyper-text document. The linking relationship between a node N71 functioning an original node and another node functioning as a referential node N72 is expressed by an one-directional arrow. Because the one-directional arrow is directed from the anchor information A1 of the original node N71 to the referential node N72, when a user currently reading the anchor information A1 of the original node N71 desires to refer to a hyper-text document related to the original node N71, the user can immediately refer to contents of the referential node N72 having the linking relationship with the node N71. That is, a referential movement from the original node N71 to the referential node N72 is performed.

FIG. 11 shows pieces of link automatic production information stored in the link automatic production information storing unit 32.

As shown in FIG. 11, a combination of connection type information, an index template, a function button template, an index producing rule and a function button producing rule in each piece of link automatic production information is selected by selecting the connection type information. For example, when a user selects connection type information "jtype A" displayed on the displaying unit 19 by inputting a link automatic production information selecting instruction to the receiving unit 33, an index template "index temp A", a function button template "button temp A", an index producing rule "index rule A" and a function button producing rule "button rule B) are automatically selected.

The index template is a model of a list of one child node or one or more groups of child nodes, and the list is allocated to a parent node as anchor information classified into an anchor character string and functions as index information. One or more child nodes written in the list are determined according to the index producing rule. Therefore, the index information allocated to the parent node is prepared from the index template and the index producing rule. When a user allocates index information to a parent node, a linking relationship between the parent node functioning as an original node and each of child nodes listed in the index information is established, and the parent node is used as a reference starting point. Therefore, the user can refer to each of the child nodes listed in the index information.

The function button template is a model of one or more types of function buttons, and one or more types of function buttons are allocated to each of child nodes as anchor information classified into an anchor figure and function as function button information. As the function button information, there are three types. A first type of button allocated to a current child node denotes a linking relationship in which the current child node is set as an original node and another child node placed on the left side of the current child node is set as a referential node, a second type of button allocated to a current child node denotes a linking relationship in which the current child node is set as an original node and another child node placed on the right side of the current child node is set as a referential node, and a third type of button allocated to a current child node denotes a linking relationship in which the current child node is set as an original node and the parent node is set as a referential node. The type of the function button allocated to each child node is determined according to the function button producing rule. Therefore, one or more function buttons are allocated to each child node according to the function button template and the function button producing rule. In this embodiment, the first type of button is expressed by a first figure of a left-directional arrow, the second type of button is expressed by a second figure of a right-directional arrow and the third type of button is expressed by a third figure of an upper-directional arrow. The first, second and third figures are drawn by using bit map information.

Figure 13:
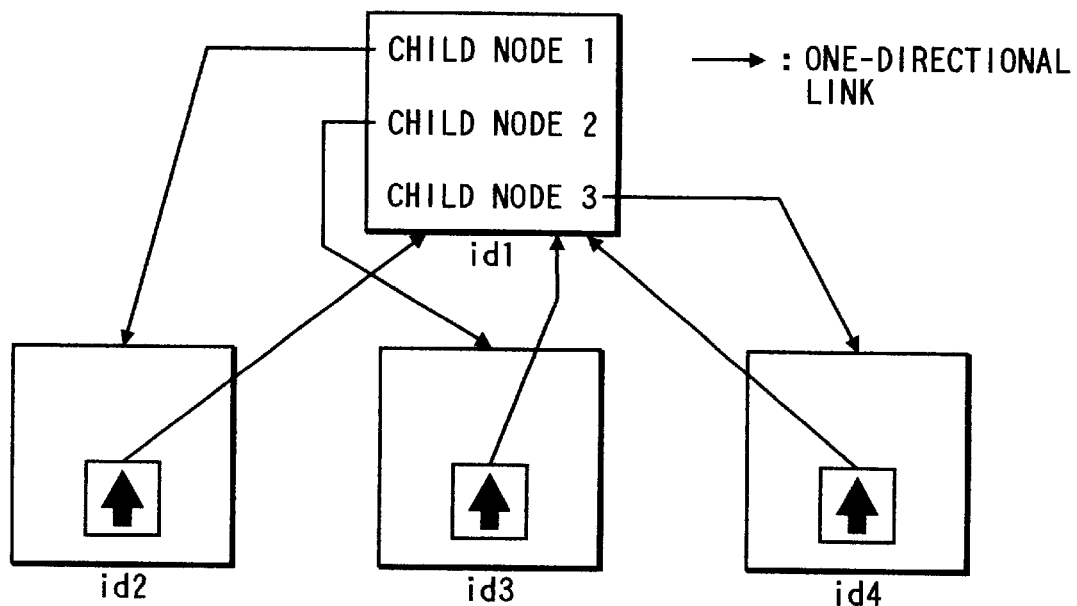
FIG. 13 shows a plurality of hyper-text documents indicated by hyper-text expression information obtained in cases where the link automatic production information shown in FIG. 12 is produced in the link information automatic producing unit.

FIG. 12 shows an example of a hierarchy structure of nodes and link automatic production information determined in cases where a user selects connection type information "jtype Headline", and FIG. 13 shows a plurality of hyper-text documents indicated by hyper-text expression information of the hyper-text document preparing unit 35 obtained in cases where the link automatic production information shown in FIG. 12 is produced in the link information automatic producing unit 34.

As shown in FIG. 12, when a user selects connection type information "jtype Headline" on condition that node information of four nodes id1 to id4 are produced in the node managing unit 13 and a hierarchy structure composed of the parent node id1 and the group of child nodes id2 to id3 is produced in the hierarchy structure managing unit 15, an index producing rule indicating a list of child nodes of which the number is the same as the number of child nodes id2 to id3 is automatically selected according to the connection type information, an index template indicating a first child node, a second child node and a third child node is automatically selected as elements of index information according to the index producing rule, the node information and the hierarchy structure information, a function button producing rule indicating the allocation of the third type of function button to each of the child nodes id2 to id4 is automatically selected according to the connection type information, and a function button template indicating the third type of function button is automatically selected as button function information according to the function button producing rule. This automatic selection of the index producing rule, the index template, the function button producing rule and the function button template is performed in the link information automatic producing unit 34. Thereafter, in the link information automatic producing unit 34, the index information expressed by one or more character strings is allocated to the parent node id1 as anchor information, and the button function information expressed by one or more figures is allocated to each of the child nodes id2 to id4 to automatically establish a linking relationship between one node functioning as an original node and another node functioning as a referential node for each node.

Thereafter, as shown in FIG. 13, a group of hyper-text documents in which the index information or the button function information is allocated to each of the nodes and the hyper-text documents are connected with each other so as to directly refer to one of the child nodes and return to the parent node id1 is automatically prepared in the hyper-text document preparing unit 35.

Accordingly, the user can easily obtain the hierarchy structure of the group of hyper-text documents in which linking relationships among the hyper-text documents are automatically prepared by selecting the connection type information "jtype Headline". Also, in cases where the user selects connection type information "jtype Headline" displayed on the displaying unit 19 by inputting a link automatic production information selecting instruction to the receiving unit 33, when the user selects one child node listed in the index information, the user can refer to any one among the child nodes as a referential node.

Figure 15:
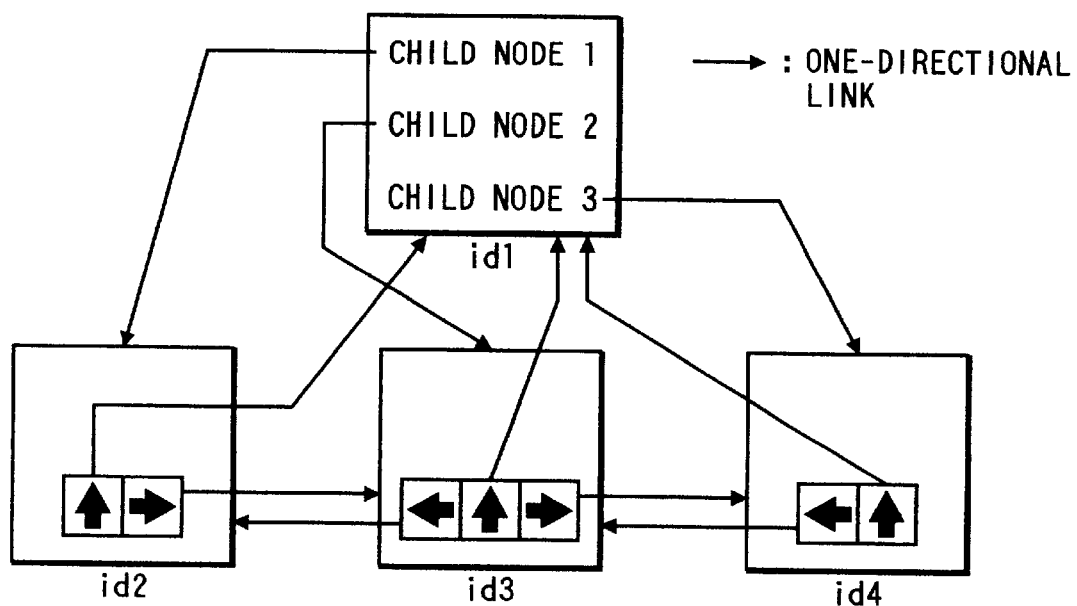
FIG. 15 shows a plurality of hyper-text documents indicated by hyper-text expression information obtained in cases where the link automatic production information shown in FIG. 14 is produced in the link information automatic producing unit.

FIG. 14 shows an example of a hierarchy structure of nodes and link automatic production information determined in cases where a user selects connection type information "jtype Headline and Ranking", and FIG. 15 shows a plurality of hyper-text documents indicated by hyper-text expression information of the hyper-text document preparing unit 35 obtained in cases where the link automatic production information shown in FIG. 14 is produced in the link information automatic producing unit 34.

As shown in FIG. 14, when a user selects connection type information "jtype Headline and Ranking" on condition that node information of four nodes id1 to id4 are produced in the node managing unit 13 and a hierarchy structure composed of the parent node id1 and the group of child nodes id2 to id3 is produced in the hierarchy structure managing unit 15, an index producing rule indicating a list of child nodes of which the number is the same as the number of child nodes id2 to id3 is automatically selected according to the connection type information, an index template indicating a first child node, a second child node and a third child node is automatically selected as elements of index information according to the index producing rule, the node information and the hierarchy structure information, a function button producing rule indicating the allocation of the second type of function button and the third type of function button to one child node (called a top child node) placed on the leftmost side among the child nodes, the allocation of the first type of function button, the second type of function button and the third type of function button to one or more child nodes (respectively called an intermediate child node) respectively placed between two child nodes and the allocation of the first type of function button and the third type of function button to one child node (called a final child node) placed on the rightmost side among the child nodes is automatically selected according to the connection type information, and a function button template indicating the first type of function button, the second type of function button and the third type of function button is automatically selected as button function information according to the function button producing rule.

Thereafter, as shown in FIG. 15, a group of hyper-text documents in which the index information is allocated to the parent node id1 as anchor information, the button function information is allocated to each of the child nodes id2 to id4 and the hyper-text documents are connected with each other so as to directly refer to one of the child nodes or refer to the child nodes one after another is prepared in the hyper-text document preparing unit 35.

Accordingly, the user can easily obtain the hierarchy structure of the group of hyper-text documents in which linking relationships among the hyper-text documents are automatically prepared by selecting the connection type information "jtype Headline and Ranking". Also, in cases where the user selects connection type information "jtype Headline and Ranking" displayed on the displaying unit 19 by inputting a link automatic production information selecting instruction to the receiving unit 33, when the user selects one child node listed in the index information, the user can refer to any one among the child nodes as a referential node, and the user can refer to the other child nodes one after another.

Figure 17:
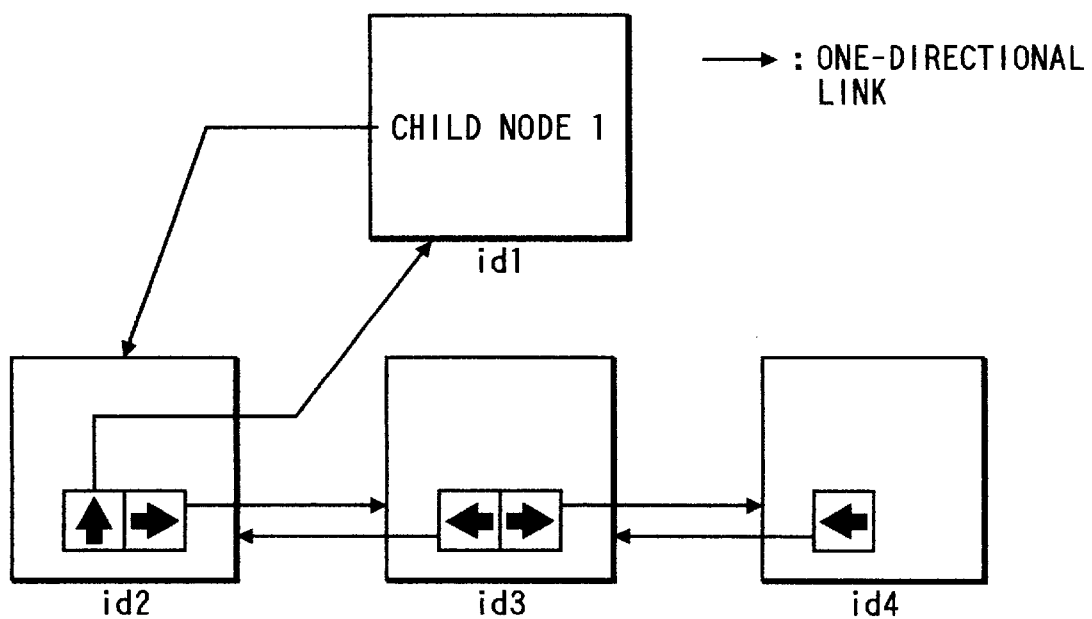
FIG. 17 shows a plurality of hyper-text documents indicated by hyper-text expression information obtained in cases where the link automatic production information shown in FIG. 16 is produced in the link information automatic producing unit.

FIG. 16 shows an example of a hierarchy structure of nodes and link automatic production information determined in cases where a user selects connection type information "jtype Ranking", and FIG. 17 shows a plurality of hyper-text documents indicated by hyper-text expression information of the hyper-text document preparing unit 35 obtained in cases where the link automatic production information shown in FIG. 16 is produced in the link information automatic producing unit 34.

As shown in FIG. 16, when a user selects connection type information "jtype Ranking" on condition that node information of four nodes id1 to id4 are produced in the node managing unit 13 and a hierarchy structure composed of the parent node id1 and the group of child nodes id2 to id3 is produced in the hierarchy structure managing unit 15, the nodes are ranked in the order of the parent node id1, the child node id2, the child node id3 and the child node id4. Therefore, an index producing rule indicating a list of a first child node corresponding to the child node id2 placed on the leftmost side among the child nodes is automatically selected according to the connection type information, an index template indicating the first child node is automatically selected as elements of index information according to the index producing rule, a function button producing rule indicating the allocation of the second type of function button and the third type of function button to the first child node, the allocation of the first type of function button and the second type of function button to one or more child nodes respectively placed between two child nodes and the allocation of the first type of function button to one child node placed on the rightmost side among the child nodes is automatically selected according to the connection type information, and a function button template indicating the first type of function button, the second type of function button and the third type of function button is automatically selected as button function information according to the function button producing rule.

Thereafter, as shown in FIG. 17, a group of hyper-text documents in which the index information is allocated to the parent node id1 as anchor information, the button function information is allocated to each of the child nodes id2 to id4 and the hyper-text documents are connected with each other so as to refer to the nodes in the ranking order is prepared in the hyper-text document preparing unit 35.

Accordingly, the user can easily obtain the hierarchy structure of the group of hyper-text documents in which linking relationships among the hyper-text documents are automatically prepared by selecting the connection type information "jtype Ranking". Also, in cases where the user selects connection type information "jtype Ranking" displayed on the displaying unit 19, the user can refer to the nodes one after another in the ranking order.

Third Embodiment

Figure 18:
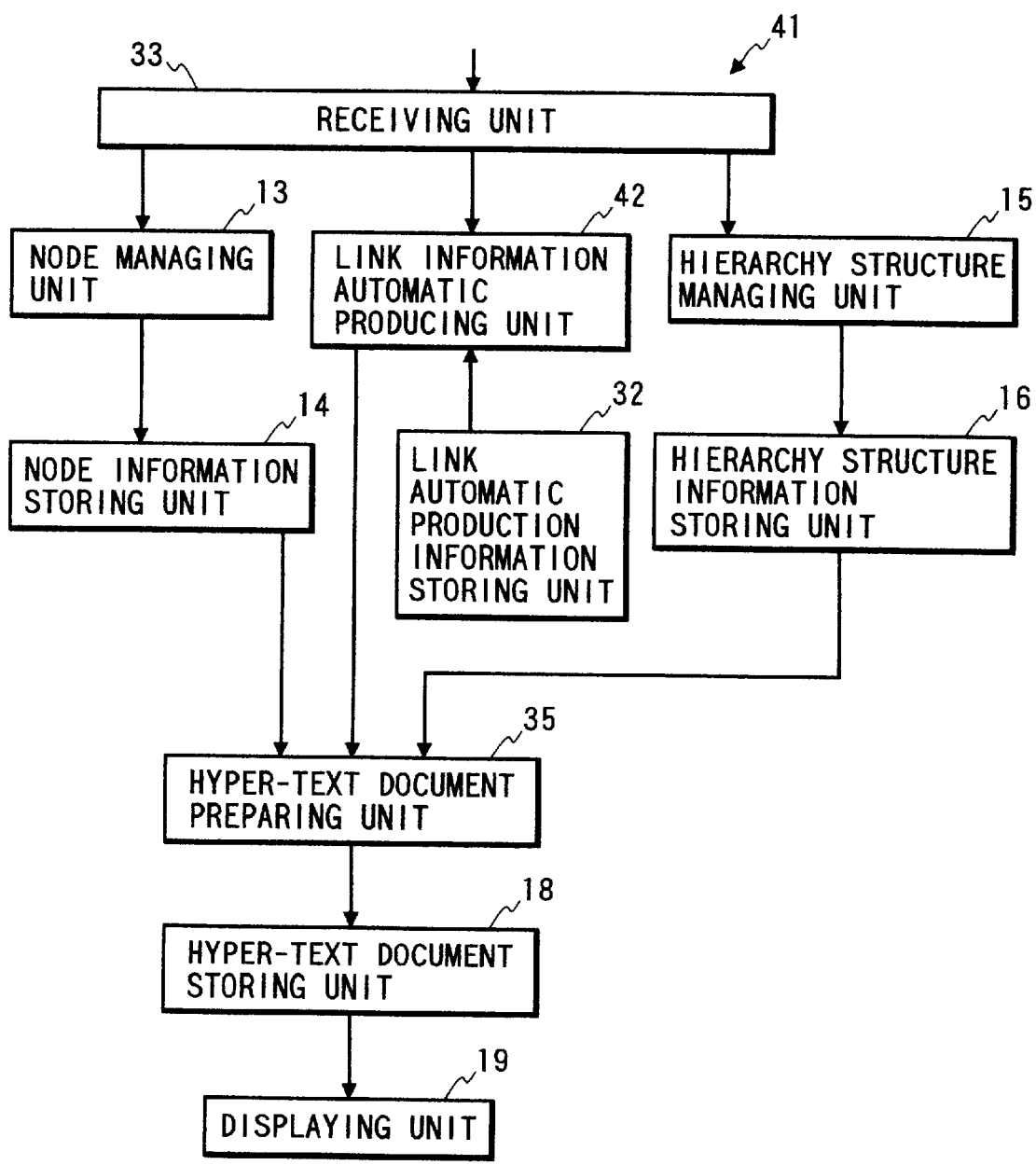
FIG. 18 is a block diagram of a hyper-text document preparing apparatus according to a third embodiment of the present invention.

FIG. 18 is a block diagram of a hyper-text document preparing apparatus according to a third embodiment of the present invention.

As shown in FIG. 18, a hyper-text document preparing apparatus 41 comprises the link automatic production information storing unit 32, the receiving unit 33, the node managing unit 13, the node information storing unit 14, the hierarchy structure managing unit 15, the hierarchy structure information storing unit 16, a link information automatic producing unit 42 for performing the same operation as that performed in the link information automatic producing unit 34, extracting title information indicating a title of one node from the node information produced in the node managing unit 13 for each of the nodes, allocating pieces of title information of child nodes to a parent node as the index information and attaching each piece of title information to the corresponding child node, the hyper-text document preparing unit 35, the hyper-text document storing unit 18, and the displaying unit 19.

Figure 19:
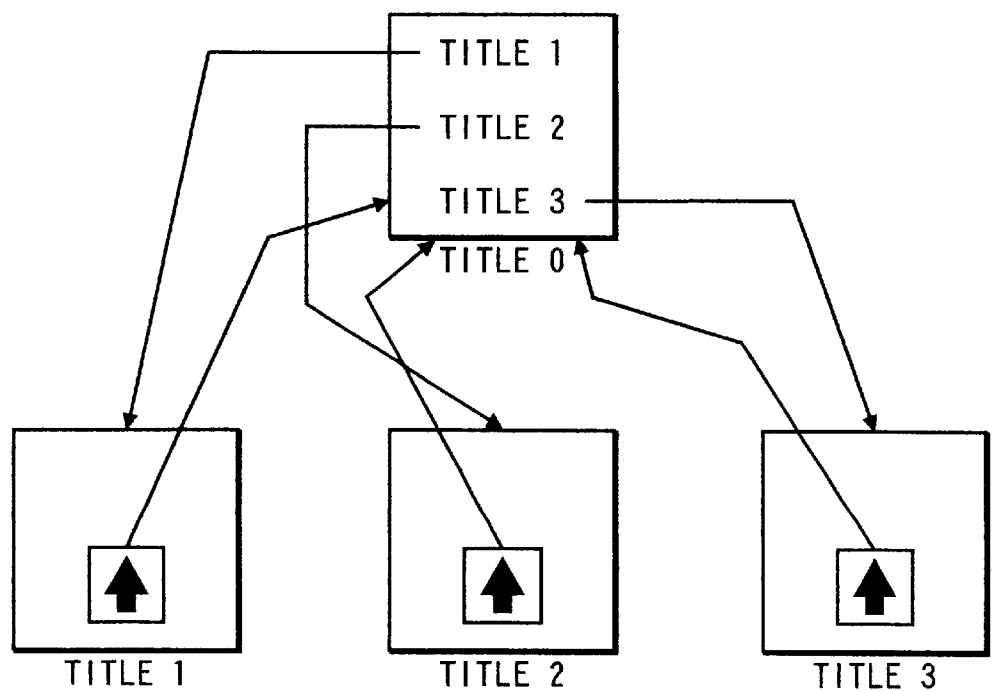
FIG. 19 shows a plurality of nodes arranged in linking relationships and titles attached to the nodes.

In the above configuration, the node information produced in the node managing unit 13 includes title information of each node. Pieces of title information of child nodes are allocated to a parent node as the index information, and each piece of title information is attached to the corresponding child node. Also, title information of the parent node is attached to the parent node. Therefore, as shown in FIG. 19, a hierarchy structure of nodes with title information can be obtained. In this case, when title information of one child node is changed to new title information in the node managing unit 13, the title information of the child node which is allocated to the parent node as the index information and is attached to the child node is automatically changed to the new title information. Also, in cases where title information of one child node allocated to a parent node is changed to new title information, the title information attached to the child node is automatically changed to the new title information.

Accordingly, the user can easily know the title of each child node.

Fourth Embodiment

Figure 20:
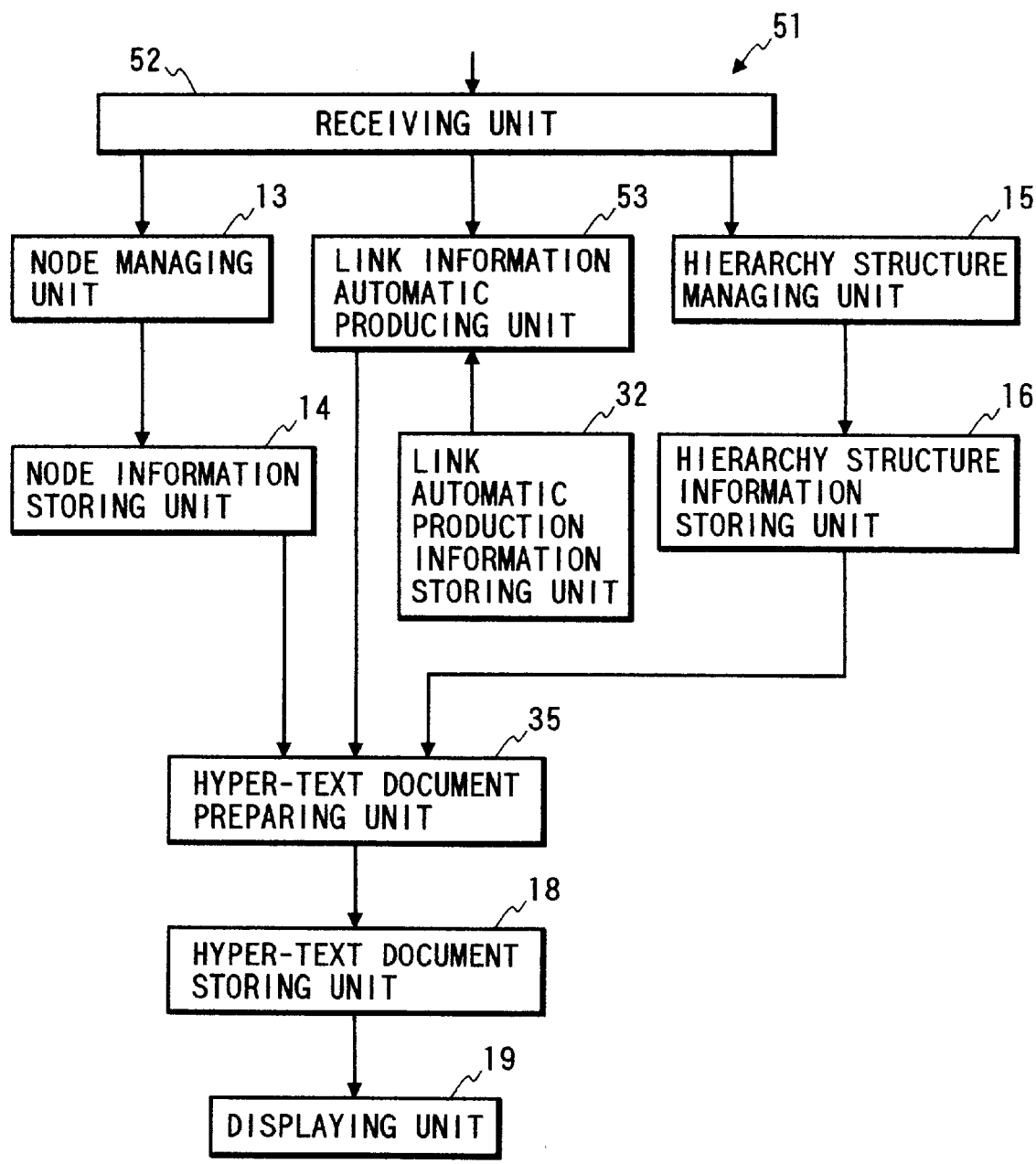
FIG. 20 is a block diagram of a hyper-text document preparing apparatus according to a fourth embodiment of the present invention.

FIG. 20 is a block diagram of a hyper-text document preparing apparatus according to a fourth embodiment of the present invention.

As shown in FIG. 20, a hyper-text document preparing apparatus 51 comprises
the link automatic production information storing unit 32,
a receiving unit 52 for receiving pieces of character information, pieces of connection information, a link automatic production information selecting instruction, supplementary information and management information in the same manner as in the receiving unit 31 and receiving an index information changing instruction indicating the change of title information of a child node,
the node managing unit 13, the node information storing unit 14, the hierarchy structure managing unit 15, the hierarchy structure information storing unit 16,
a link information automatic producing unit 53 for performing the same operation as that performed in the link information automatic producing unit 42, changing title information allocated to the parent node as the index information to new title information according to the index information changing instruction, informing the node managing unit 13 of the change of the title information to change the title information of the child node to the new title information and changing the title information attached to the child node to new title information,
the hyper-text document preparing unit 35, the hyper-text document storing unit 18, and the displaying unit 19.

In the above configuration, when a user inputs an index information changing instruction to change a title of a child node allocated to a parent node as the index information to a new title, the title allocated to the parent node is changed to the new title by the link information automatic producing unit 53.

Also, the change of the title is informed the node managing unit 13. In the unit 13, the title included in node information corresponding to the child node is changed to the new title. Also, the title attached to the child node is changed to the new title.

Therefore, when a title allocated to the parent node is changed according to a user's requirement, the title attached to the corresponding child node can be automatically changed, and node information corresponding to the child node can be automatically changed.

Accordingly, in the second to fourth embodiments, the preparation and revision of linking relationships among nodes can be efficiently performed.

Fifth Embodiment

Figure 21:
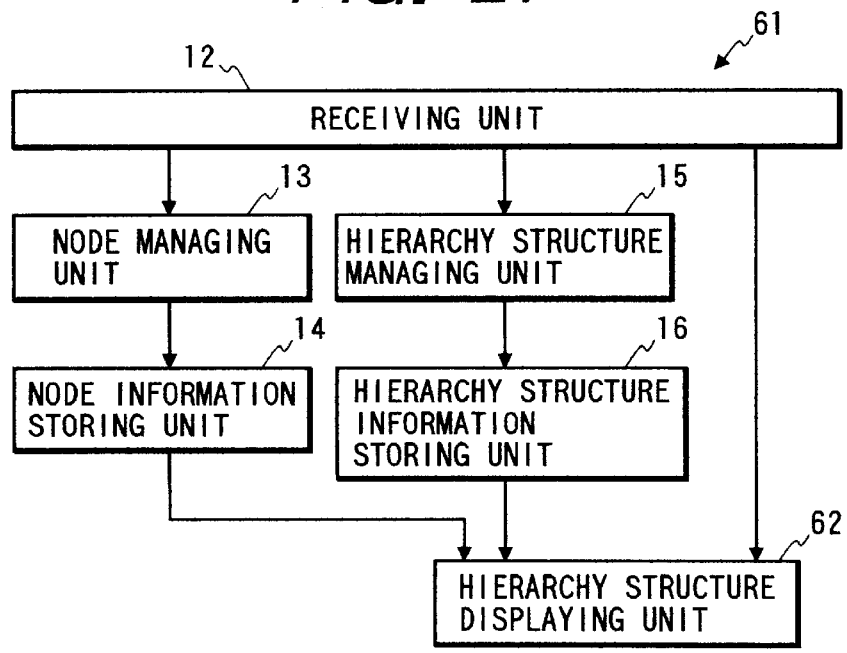
FIG. 21 is a block diagram of a hyper-text document preparing apparatus according to a fifth embodiment of the present invention.

FIG. 21 is a block diagram of a hyper-text document preparing apparatus according to a fifth embodiment of the present invention.

As shown in FIG. 21, a hyper-text document preparing apparatus 61 comprises
the receiving unit 12, the node managing unit 13, the node information storing unit 14, the hierarchy structure managing unit 15, the hierarchy structure information storing unit 16, and a hierarchy structure displaying unit 62 for displaying the hierarchy structure of the nodes obtained in the hierarchy structure managing unit 15 and pieces of title information of the nodes included in the node information.

In the above configuration, the hierarchy structure information stored in the hierarchy structure information storing unit 16 and pieces of title information included in the node information of the node information storing unit 14 are transmitted to the hierarchy structure displaying unit 62, and the hierarchy structure of the nodes is displayed with the title information.

Figure 22:
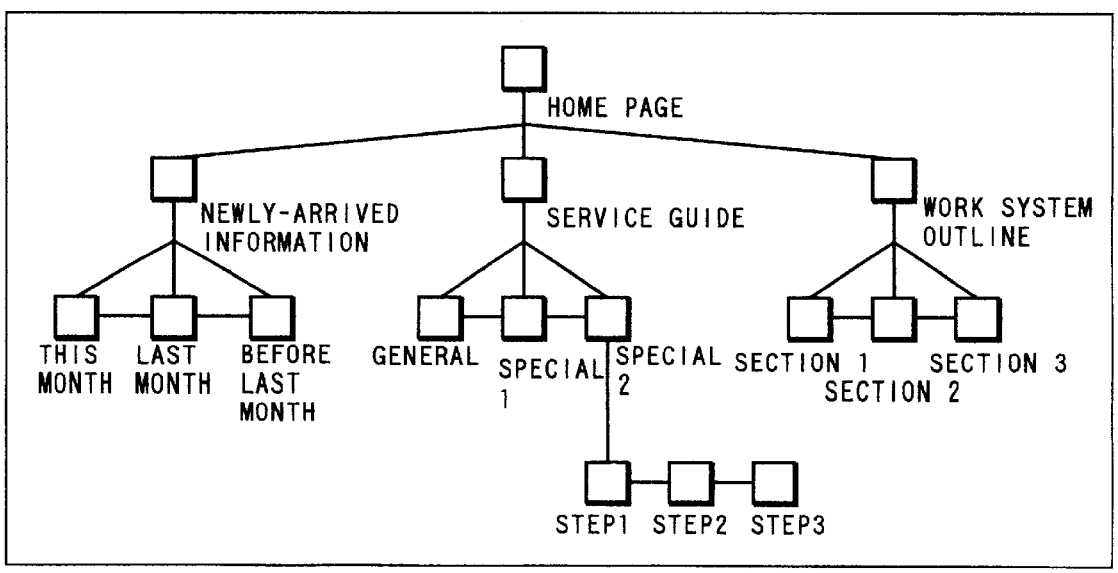
FIG. 22 shows an example of a hierarchy structure of nodes displayed with title information by a hierarchy structure displaying unit shown in FIG. 21.

FIG. 22 shows an example of the hierarchy structure of the nodes displayed with the title information by the hierarchy structure displaying unit 62.

As shown in FIG. 22, three first-level child nodes are related to a parent node according to the connection type information "jtype Headline", three second-level child nodes are related to each first-level child node according to the connection type information "jtype Headline and Ranking", and three third-level child nodes are related to one of the second-level child nodes according to the connection type information "jtype Ranking". A title "home page" is displayed with the parent node, titles "newly-arrived information", "service guide" and "work system outline" are displayed with the first-level child nodes, and a title is displayed with each of the second-level child nodes and the third-level child nodes.

Accordingly, because the user can view the hierarchy structure of the nodes, the user can easily grasp the hierarchy structure of the nodes.

It is applicable that a displaying range specifying instruction be received by the receiving unit 12 and a hierarchy structure of a plurality of nodes existing in a displaying range specified by the displaying range specifying instruction be displayed with the title information.

Sixth Embodiment

Figure 23:
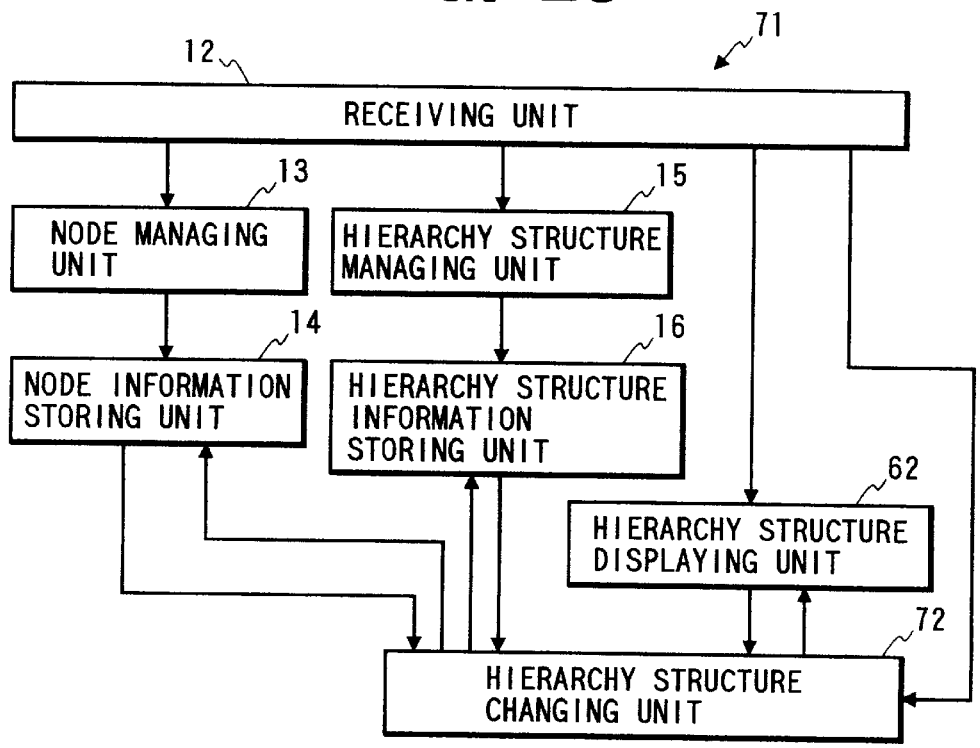
FIG. 23 is a block diagram of a hyper-text document preparing apparatus according to a sixth embodiment of the present invention.

FIG. 23 is a block diagram of a hyper-text document preparing apparatus according to a sixth embodiment of the present invention.

As shown in FIG. 23, a hyper-text document preparing apparatus 71 comprises
the receiving unit 12, the node managing unit 13, the node information storing unit 14, the hierarchy structure managing unit 15, the hierarchy structure information storing unit 16, a hierarchy structure changing unit 72 for interpreting a hierarchy structure changing instruction received by the receiving unit 12 and changing node information of a node or a group of nodes stored in the node information storing unit 14 or a connection-relationship between a remarked node and a node or a group of nodes stored in the hierarchy structure information storing unit 16 according to the hierarchy structure changing instruction, and
the hierarchy structure displaying unit 62 for displaying the hierarchy structure and the title information according to the node information and the hierarchy structure information changed by the hierarchy structure changing unit 72.

In the above configuration, in cases where a user desires to change contents of a node or a group of nodes or a hierarchy structure of nodes while viewing the hierarchy structure displayed by the hierarchy structure displaying unit 62, a hierarchy structure changing instruction input by the user is received by the receiving unit 12 and is transmitted to the hierarchy structure changing unit 72.

In the hierarchy structure changing unit 72, node information of a node or a group of nodes stored in the node information storing unit 14 is changed according to the instruction, or a connection-relationship between a remarked node and a node or a group of nodes stored in the hierarchy structure information storing unit 16 is changed according to the instruction in the hierarchy structure changing unit 72 to change the hierarchy structure. For example, node information of a node or a group of nodes stored in the node information storing unit 14 is deleted, node information of a node or a group of nodes is added to the node information storing unit 14, a connection-relationship between a remarked node and a node or a group of nodes is changed to a connection-relationship between another remarked node and the node or the group of nodes, or a connection-relationship between a remarked node and a node or a group of nodes is newly established in addition to a connection-relationship between another remarked node and the node or the group of nodes. Thereafter, the hierarchy structure and the title information changed by the hierarchy structure changing unit 72 are displayed by the hierarchy structure displaying unit 62.

Figure 24:
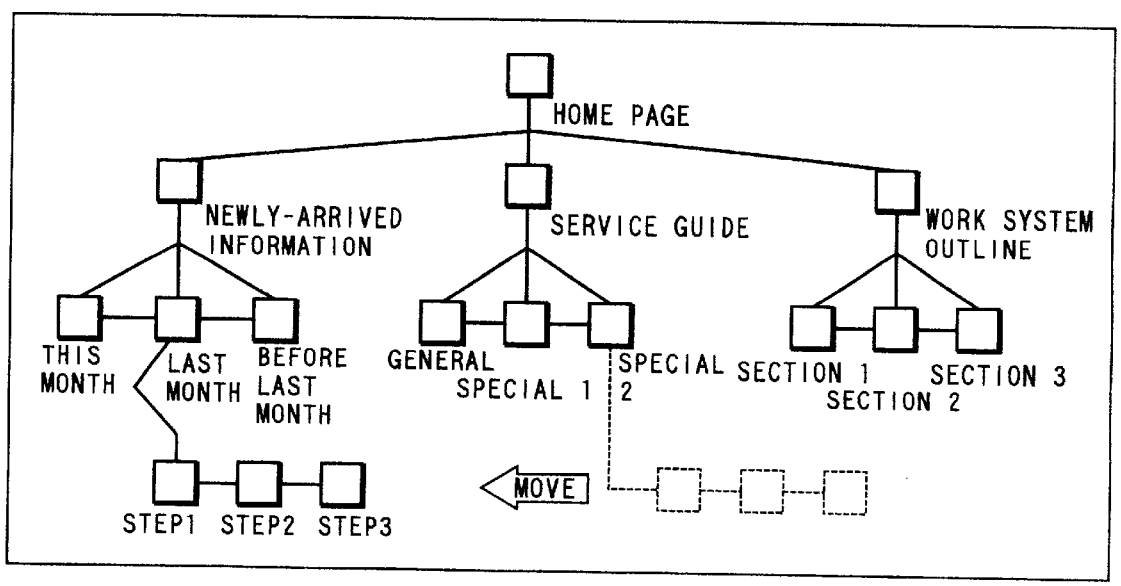
FIG. 24 shows an example of the change of a hierarchy structure.

FIG. 24 shows an example of the change of the hierarchy structure.

As shown in FIG. 24, a connection-relationship between one second-level child node having a title "special subject 2" and a group of third-level child nodes is changed to a connection-relationship between another second-level child node having a title "last month" and the group of third-level child nodes. This change is performed by moving the group of third-level child nodes toward the left direction while using a pointing device such as a mouse.

Accordingly, the user can change the hierarchy structure of the nodes.

Seventh Embodiment

Figure 25:
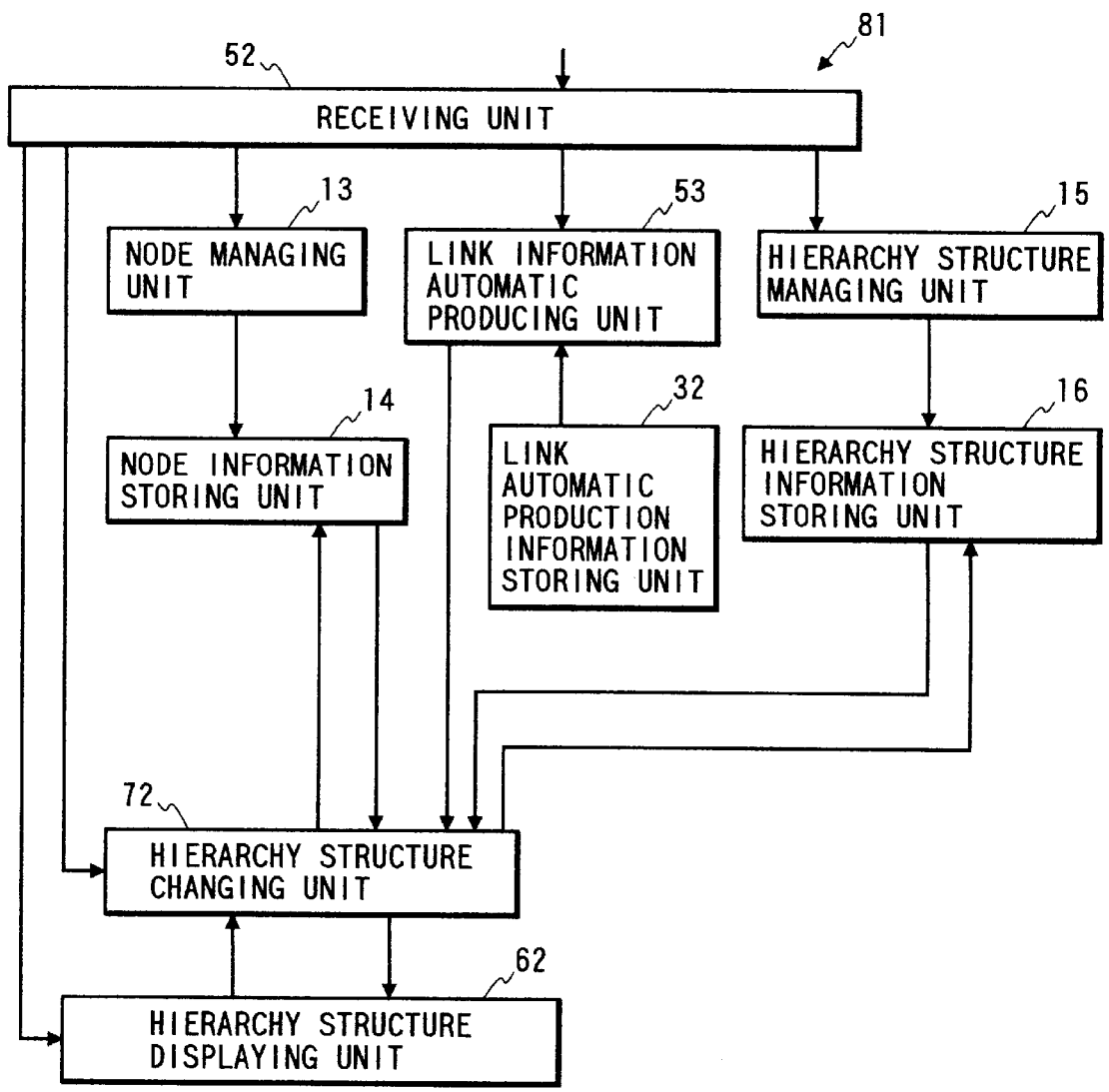
FIG. 25 is a block diagram of a hyper-text document preparing apparatus according to a seventh embodiment of the present invention.

FIG. 25 is a block diagram of a hyper-text document preparing apparatus according to a seventh embodiment of the present invention.

As shown in FIG. 25, a hyper-text document preparing apparatus 81 comprises the receiving unit 52, the node managing unit 13, the node information storing unit 14, the hierarchy structure managing unit 15, the hierarchy structure information storing unit 16, the link automatic production information storing unit 32, the link information automatic producing unit 53, a hierarchy structure changing unit 82 for interpreting a hierarchy structure changing instruction received by the receiving unit 52 and changing the hierarchy structure information stored in the hierarchy structure information storing unit 16 according to the hierarchy structure changing instruction to change a linking relationship between a parent node and a child node or a group of child nodes, and the hierarchy structure displaying unit 62 for displaying the hierarchy structure and the title information according to the node information and the hierarchy structure information changed by the hierarchy structure changing unit 72.

In the above configuration, when a connection-relationship between a parent node and a child node or a group of child nodes is changed, index information allocated to the parent node and function button information allocated to the child nodes by the link information automatic producing unit 34 are changed by the hierarchy structure changing unit 82 so as to change a linking relationship between the parent node and the child node or the group of child nodes.

Accordingly, the user can arbitrarily change a linking relationship between a parent node and a child node or a group of child nodes.

Having illustrated and described the principles of the present invention in a preferred embodiment thereof, it should be readily apparent to those skilled in the art that the invention can be modified in arrangement and detail without departing from such principles. We claim all modifications coming within the scope of the accompanying claims.

What is claimed is:

1. A hyper-text document preparing apparatus, comprising:

receiving means for receiving pieces of character information respectively indicating characters for a hyper-text document indicated by a node, pieces of connection information respectively indicating a connection of a node or a group of nodes with another node or another group of nodes and an information selecting instruction from a user;

node managing means for preparing or revising each of a plurality of nodes according to the pieces of character information received by the receiving means to produce pieces of node information respectively indicating contents of each node;

hierarchy structure managing means for establishing or revising a connection-relationship between a node or a group of nodes and another node or another group of nodes according to one piece of connection information received by the receiving means for each of the nodes of which the pieces of node information are produced by the node managing means and producing hierarchy structure information indicating a hierarchy structure in which the nodes having the connection-relationships with each other are arranged, one node ranked to a level higher than that of another or other nodes in the hierarchy structure being classified as a parent node, and one or more nodes ranked to a level lower than the parent node being classified as child nodes;

link automatic production information storing means for storing pieces of link automatic production information which each are composed of connection type information indicating a connection-relationship between one parent node and one child node or one group of child nodes corresponding to the parent node, a function button template indicating a list of function buttons respectively denoting a one-directional link from one child node to one parent node of the child node or another child node, and a function button producing rule indicating one or more types of function buttons allocated to each child node, wherein the function button producing rule indicates to allocate one type of function button, denoting a one-directional link from one child node to one parent node, to each child node in cases where the connection type information indicates a headline type connection;

link information automatic producing means for selecting a particular piece of link automatic production information from the pieces of link automatic production information stored in the link automatic production information storing means according to the information selecting instruction received by the receiving means for each set of one parent node and one group of child nodes arranged in the hierarchy structure, allocating one or more types of function buttons obtained from the particular piece of link automatic production information to each child node according to the function button producing rule of the particular piece of link automatic production information to automatically produce link information indicating a linking relationship among one parent node and one child node or one group of child nodes corresponding to the parent node for each parent node arranged in the hierarchy structure; and hyper-text document preparing means for preparing a group of hyper-text documents, in which a plurality of hyper-text documents are arranged in the hierarchy structure according to the hierarchy structure information produced by the hierarchy structure managing means and are linked to each other in the linking relationships according to the link information transferred from the link information automatic producing means, from the node information produced by the node managing means and the hierarchy structure information produced by the hierarchy structure managing means to perform a referential movement from one hyper-text document corresponding to one parent node to another hyper-text document corresponding to one child node and another referential movement from the hyper-text document corresponding to the child node to another hyper-text document corresponding to another child node or the hyper-text document corresponding to the parent node according to each one-dimensional link.

2. A hyper-text document preparing apparatus according to claim 1, further comprising:

displaying means for selecting a particular hyper-text document related to a remarked hyper-text document currently read by a user from the hyper-text documents prepared by the hyper-text document preparing means according to the hierarchy structure information produced by the hierarchy structure managing means and displaying the contents of the particular hyper-text document according to the corresponding piece of node information produced by the node managing means.

3. A hyper-text document preparing apparatus according to claim 1 in which each piece of link automatic production information further includes an index template indicating a list of child nodes, and an index producing rule indicating the number of child nodes existing in the list.

4. A hyper-text document preparing apparatus according to claim 1 in which each piece of node information produced by the node managing means includes title information indicating a title of a node corresponding to the node information, anchor information indicating an index of one or more titles of child nodes is obtained from the particular piece of link automatic production information and is allocated to each parent node of the child nodes, and the title information of the child nodes linked to the parent node are attached to the child nodes by the link information automatic producing means.

5. A hyper-text document preparing apparatus according to claim 4 in which an index information changing instruction indicating a change of a title of a particular child node linked to a parent node is received by the receiving means, the title allocated to the parent node is changed to a new title according to the index information changing instruction by the link information automatic producing means, the change of the title is informed the node managing means to change the title included in the node information corresponding to the particular child node to the new title, and the title attached to the particular child node is changed to new title by the link information automatic producing means.

6. A hyper-text document preparing apparatus according to claim 1 in which the function button producing rule indicates to allocate to a top child node a type of function button denoting a one-directional link from the top child node to one parent node and a type of function button denoting a one-directional link from the top child node to an intermediate child node; to allocate to an intermediate child node a type of function button denoting a one-directional link from the intermediate child node to a top child node and a type of function button denoting a one-directional link from the intermediate child node to a final child node, and to allocate to a final child node a type of function button denoting a one-directional link from the final child node to an intermediate child node, in cases where the connection type information indicates a ranking type connection.

7. A hyper-text document preparing apparatus, comprising:

receiving means for receiving pieces of character information respectively indicating characters for a hyper-text document indicated by a node, pieces of connection information respectively indicating a connection of a node or a group of nodes with another node or another group of nodes and an information selecting instruction;

node managing means for preparing or revising each of a plurality of nodes according to the pieces of character information received by the receiving means to produce pieces of node information respectively indicating contents of each node;

hierarchy structure managing means for establishing or revising a connection-relationship between a node or a group of nodes and another node or another group of nodes according to one piece of connection information received by the receiving means for each of the nodes of which the pieces of node information are produced by the node managing means and producing hierarchy structure information indicating a hierarchy structure in which the nodes having the connection-relationships with each other are arranged, one node ranked to a level higher than that of another or other nodes in the hierarchy structure being classified as a parent node, and one or more nodes ranked to a level lower than the parent node being classified as child nodes;

link automatic production information storing means for storing pieces of link automatic production information which each are composed of connection type information indicating a connection-relationship between one parent node and one child node or one group of child nodes corresponding to the parent node, a function button template indicating a list of function buttons respectively denoting a one-directional link from one child node to one parent node of the child node or another child node, and a function button producing rule indicating one or more types of function buttons allocated to each child node, wherein the function button producing rule indicates to allocate one type of function button, denoting a one-directional link from one child node to one parent node, to each child node in cases where the connection type information indicates a headline type connection;

link information automatic producing means for selecting a particular piece of link automatic production information from the pieces of link automatic production information stored in the link automatic production information storing means according to the information selecting instruction received by the receiving means for each set of one parent node and one group of child nodes arranged in the hierarchy structure, allocating one or more types of function buttons obtained from the particular piece of link automatic production information to each child node according to the function button producing rule of the particular piece of link automatic production information to automatically produce link information indicating a linking relationship among one parent node and one child node or one group of child nodes corresponding to the parent node for each parent node arranged in the hierarchy structure; and hierarchy structure displaying means for preparing the hierarchy structure of the nodes, which are related to each other in the linking relationships according to the link information produced by the link information automatic producing means, from the hierarchy structure information produced by the hierarchy structure managing means and displaying the hierarchy structure of the nodes.

8. A hyper-text document preparing apparatus according to claim 7 in which each piece of node information produced by the node managing means includes title information indicating a title of a node corresponding to the node information, and titles of the nodes are displayed with the hierarchy structure of the nodes by the hierarchy structure displaying means.

9. A hyper-text document preparing apparatus according to claim 7, further comprising hierarchy structure changing means for changing the hierarchy structure information produced by the hierarchy structure managing means according to a hierarchy structure changing instruction received by the receiving means, a changed hierarchy structure of a plurality of nodes being prepared and displayed by the hierarchy structure displaying means according to the changed hierarchy structure information.

10. A hyper-text document preparing apparatus according to claim 7 in which the function button producing rule indicates to allocate to a top child node a type of function button denoting a one-directional link from the top child node to one parent node and a type of function button denoting a one-directional link from the top child node to an intermediate child node; to allocate to an intermediate child node a type of function button denoting a one-directional link from the intermediate child node to a top child node and a type of function button denoting a one-directional link from the intermediate child node to a final child node, and to allocate to a final child node a type of function button denoting a one-directional link from the final child node to an intermediate child node, in cases where the connection type information indicates a ranking type connection.

11. A hyper-text document preparing apparatus, comprising:

receiving means for receiving pieces of character information respectively indicating characters for a hyper-text document indicated by a node, pieces of connection information respectively indicating a connection of a node or a group of nodes with another node or another group of nodes and an information selecting instruction from a user;

node managing means for preparing or revising each of a plurality of nodes according to the pieces of character information received by the receiving means to produce pieces of node information respectively indicating contents of each node;

hierarchy structure managing means for establishing or revising a connection-relationship between a node or a group of nodes and another node or another group of nodes according to one piece of connection information received by the receiving means for each of the nodes of which the pieces of node information are produced by the node managing means and producing hierarchy structure information indicating a hierarchy structure in which the nodes having the connection-relationships with each other are arranged, one node ranked to a level higher than that of another or other nodes in the hierarchy structure being classified as a parent node, and one or more nodes ranked to a level lower than the parent node being classified as child nodes;

link automatic production information storing means for storing pieces of link automatic production information which each are composed of connection type information indicating a connection-relationship between one parent node and one child node or one group of child nodes corresponding to the parent node, a function button template indicating a list of function buttons respectively denoting a one-directional link from one child node to one parent node of the child node or another child node, and a function button producing rule indicating one or more types of function buttons allocated to each child node, wherein the function button producing rule indicates to allocate to a top child node a type of function button denoting a one-directional link from the top child node to one parent node and a type of function button denoting a one-directional link from the top child node to an intermediate child node; to allocate to an intermediate child node a type of function button denoting a one-directional link from the intermediate child node to a top child node, a type of function button denoting a one-directional link from the intermediate child node to one parent node, and a type of function button denoting a one-directional link from the intermediate child node to a final child node; and to allocate to a final child node a type of function button denoting a one-directional link from the final child node to an intermediate child node, a type of function button denoting a one-directional link from the final child node to a parent node, in cases where the connection type information indicates a headline and ranking type connection;

link information automatic producing means for selecting a particular piece of link automatic production information from the pieces of link automatic production information stored in the link automatic production information storing means according to the information selecting instruction received by the receiving means for each set of one parent node and one group of child nodes arranged in the hierarchy structure, allocating one or more types of function buttons obtained from the particular piece of link automatic production information to each child node according to the function button producing rule of the particular piece of link automatic production information to automatically produce link information indicating a linking relationship among one parent node and one child node or one group of child nodes corresponding to the parent node for each parent node arranged in the hierarchy structure; and hyper-text document preparing means for preparing a group of hyper-text documents, in which a plurality of hyper-text documents are arranged in the hierarchy structure according to the hierarchy structure information produced by the hierarchy structure managing means and are linked to each other in the linking relationships according to the link information transferred from the link information automatic producing means, from the node information produced by the node managing means and the hierarchy structure information produced by the hierarchy structure managing means to perform a referential movement from one hyper-text document corresponding to one parent node to another hyper-text document corresponding to one child node and another referential movement from the hyper-text document corresponding to the child node to another hyper-text document corresponding to another child node or the hyper-text document corresponding to the parent node according to each one-dimensional link.

12. A hyper-text document preparing apparatus according to claim 11, further comprising:

displaying means for selecting a particular hyper-text document related to a remarked hyper-text document currently read by a user from the hyper-text documents prepared by the hyper-text document preparing means according to the hierarchy structure information produced by the hierarchy structure managing means and displaying the contents of the particular hyper-text document according to the corresponding piece of node information produced by the node managing means.

13. A hyper-text document preparing apparatus according to claim 11 in which each piece of link automatic production information further includes an index template indicating a list of child nodes, and an index producing rule indicating the number of child nodes existing in the list.

14. A hyper-text document preparing apparatus according to claim 11 in which each piece of node information produced by the node managing means includes title information indicating a title of a node corresponding to the node information, anchor information indicating an index of one or more titles of child nodes is obtained from the particular piece of link automatic production information and is allocated to each parent node of the child nodes, and the title information of the child nodes linked to the parent node are attached to the child nodes by the link information automatic producing means.

15. A hyper-text document preparing apparatus according to claim 14 in which an index information changing instruction indicating a change of a title of a particular child node linked to a parent node is received by the receiving means, the title allocated to the parent node is changed to a new title according to the index information changing instruction by the link information automatic producing means, the change of the title is informed the node managing means to change the title included in the node information corresponding to the particular child node to the new title, and the title attached to the particular child node is changed to new title by the link information automatic producing means.

16. A hyper-text document preparing apparatus, comprising:

receiving means for receiving pieces of character information respectively indicating characters for a hyper-text document indicated by a node, pieces of connection information respectively indicating a connection of a node or a group of nodes with another node or another group of nodes and an information selecting instruction;

node managing means for preparing or revising each of a plurality of nodes according to the pieces of character information received by the receiving means to produce pieces of node information respectively indicating contents of each node;

hierarchy structure managing means for establishing or revising a connection-relationship between a node or a group of nodes and another node or another group of nodes according to one piece of connection information received by the receiving means for each of the nodes of which the pieces of node information are produced by the node managing means and producing hierarchy structure information indicating a hierarchy structure in which the nodes having the connection-relationships with each other are arranged, one node ranked to a level higher than that of another or other nodes in the hierarchy structure being classified as a parent node, and one or more nodes ranked to a level lower than the parent node being classified as child nodes;

link automatic production information storing means for storing pieces of link automatic production information which each are composed of connection type information indicating a connection-relationship between one parent node and one child node or one group of child nodes corresponding to the parent node, a function button template indicating a list of function buttons respectively denoting a one-directional link from one child node to one parent node of the child node or another child node, and a function button producing rule indicating one or more types of function buttons allocated to each child node, wherein the function button producing rule indicates to allocate to a top child node a type of function button denoting a one-directional link from the top child node to one parent node and a type of function button denoting a one-directional link from the top child node to an intermediate child node; to allocate to an intermediate child node a type of function button denoting a one-directional link from the intermediate child node to a top child node, a type of function button denoting a one-directional link from the intermediate child node to one parent node, and a type of function button denoting a one-directional link from the intermediate child node to a final child node; and to allocate to a final child node a type of function button denoting a one-directional link from the final child node to an intermediate child node, a type of function button denoting a one-directional link from the final child node to a parent node, in cases where the connection type information indicates a headline and ranking type connection;

link information automatic producing means for selecting a particular piece of link automatic production information from the pieces of link automatic production information stored in the link automatic production information storing means according to the information selecting instruction received by the receiving means for each set of one parent node and one group of child nodes arranged in the hierarchy structure, allocating one or more types of function buttons obtained from the particular piece of link automatic production information to each child node according to the function button producing rule of the particular piece of link automatic production information to automatically produce link information indicating a linking relationship among one parent node and one child node or one group of child nodes corresponding to the parent node for each parent node arranged in the hierarchy structure; and hierarchy structure displaying means for preparing the hierarchy structure of the nodes, which are related to each other in the linking relationships according to the link information produced by the link information automatic producing means, from the hierarchy structure information produced by the hierarchy structure managing means and displaying the hierarchy structure of the nodes.

17. A hyper-text document preparing apparatus according to claim 16 in which each piece of node information produced by the node managing means includes title information indicating a title of a node corresponding to the node information, and titles of the nodes are displayed with the hierarchy structure of the nodes by the hierarchy structure displaying means.

18. A hyper-text document preparing apparatus according to claim 16, further comprising hierarchy structure changing means for changing the hiera structure information produced by the hierarchy structure managing means according to a hierarchy structure changing instruction received by the receiving means, a changed hierarchy structure of a plurality of nodes being prepared displayed by the hierarchy structure displaying means according to the changed hierarchy structure information.

* * * * *

UNITED STATES PATENT AND TRADEMARK OFFICE
CERTIFICATE OF CORRECTION

PATENT NO. : 6,336,123 B2
DATED : January 1, 2002
INVENTOR(S) : Inoue et al.

It is certified that error appears in the above-identified patent and that said Letters Patent is hereby corrected as shown below:

Title page, Item [54] and Column 1, lines 1-2,
Title, should read -- HYPER-TEXT DOCUMENT PREPARING APPARATUS --

Signed and Sealed this

Twenty-eighth Day of September, 2004

JON W. DUDAS
*Director of the United States Patent and Trademark Office*

UNITED STATES PATENT AND TRADEMARK OFFICE
CERTIFICATE OF CORRECTION

PATENT NO. : 6,336,123 B2
DATED : January 1, 2002
INVENTOR(S) : Kazunori Inoue et al.

It is certified that error appears in the above-identified patent and that said Letters Patent is hereby corrected as shown below:

<u>Column 28,</u>
Line 5, delete "hiera" and insert -- hierarchy --

Signed and Sealed this

Twenty-sixth Day of July, 2005

JON W. DUDAS
*Director of the United States Patent and Trademark Office*